United States Patent
Yang et al.

(10) Patent No.: US 12,483,360 B2
(45) Date of Patent: Nov. 25, 2025

(54) HYBRID AUTOMATIC REPEAT REQUEST CODEBOOK RETRANSMISSION

(71) Applicant: QUALCOMM Incorporated, San Diego, CA (US)

(72) Inventors: Wei Yang, San Diego, CA (US); Konstantinos Dimou, New York City, NY (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 17/661,312

(22) Filed: Apr. 29, 2022

(65) Prior Publication Data

US 2023/0353288 A1  Nov. 2, 2023

(51) Int. Cl.
*H04L 1/1829* (2023.01)
*H04L 5/00* (2006.01)
*H04W 72/23* (2023.01)

(52) U.S. Cl.
CPC .......... *H04L 1/1861* (2013.01); *H04L 5/0055* (2013.01); *H04W 72/23* (2023.01)

(58) Field of Classification Search
CPC ..... H04L 1/1861; H04L 5/0055; H04W 72/23
See application file for complete search history.

(56) References Cited

U.S. PATENT DOCUMENTS 10,841,914 B2 * 11/2020 Liou ..................... H04L 5/0094
10,993,141 B2 *  4/2021 Huang ............... H04W 72/1263

11,711,172 B1 *  7/2023 Dimou ................. H04L 1/1812
                                                                370/329
2018/0376490 A1 * 12/2018 Lunttila ................ H04L 1/1854
2019/0081764 A1 *  3/2019 Guan ........................ H04L 1/16
2020/0220663 A1 *  7/2020 Tsai ...................... H04L 1/1822
2020/0358504 A1 * 11/2020 Takeda ................. H04L 5/0055
2020/0382997 A1 * 12/2020 Nemeth ............ H04W 72/0446
2021/0028891 A1 *  1/2021 Zhou ...................... H04W 4/40

(Continued)

FOREIGN PATENT DOCUMENTS

WO   WO-2023152933 A1 *  8/2023
WO   WO-2023158672 A1 *  8/2023

OTHER PUBLICATIONS

Apple Inc: "HARQ Feedback Enhancements for URLLC", R1-2110027, 3GPP TSG RAN WG1 #106bis-e, 3rd Generation Partnership Project, Mobile Competence Centre, 650, Route Des Lucioles, F-06921 Sophia-Antipolis Cedex, France, vol. RAN WG1, No. E-Meeting, Oct. 11, 2021-Oct. 19, 2021 Oct. 2, 2021, pp. 1-10, XP052058963, p. 5, last par. before section 3.

(Continued)

*Primary Examiner* — Michael J Moore, Jr.
(74) *Attorney, Agent, or Firm* — Harrity & Harrity LLP

(57) ABSTRACT

Various aspects of the present disclosure generally relate to wireless communication. In some aspects, a user equipment (UE) may receive an indication to retransmit hybrid automatic repeat request (HARQ) feedback associated with an initial transmission on a first channel. The UE may transmit a HARQ codebook associated with the HARQ feedback on a second channel, wherein the HARQ codebook is based at least in part on at least one of: a first channel type of the first channel, or a second channel type of the second channel. Numerous other aspects are described.

30 Claims, 12 Drawing Sheets

(56) References Cited

U.S. PATENT DOCUMENTS

| | | | | |
|---|---|---|---|---|
| 2021/0050950 | A1* | 2/2021 | Zhou | H04W 72/21 |
| 2021/0351876 | A1* | 11/2021 | Huang | H04L 1/1861 |
| 2022/0038218 | A1* | 2/2022 | Kim | H04L 5/0044 |
| 2022/0191897 | A1* | 6/2022 | Mu | H04L 5/0094 |
| 2022/0330234 | A1* | 10/2022 | Yang | H04L 5/0057 |
| 2022/0330307 | A1* | 10/2022 | Korhonen | H04L 1/1854 |
| 2023/0046759 | A1* | 2/2023 | Wang | H04L 1/1812 |
| 2023/0095598 | A1* | 3/2023 | Zhang | H04L 1/08 370/329 |
| 2023/0171038 | A1* | 6/2023 | Yang | H04L 5/0055 370/329 |
| 2023/0254072 | A1* | 8/2023 | Khoshnevisan | H04L 5/0053 |
| 2023/0353288 | A1* | 11/2023 | Yang | H04L 1/1861 |
| 2023/0403104 | A1* | 12/2023 | Dimou | H04L 1/0061 |
| 2024/0107513 | A1* | 3/2024 | Gou | H04L 1/1822 |
| 2024/0204919 | A1* | 6/2024 | He | H04L 1/189 |
| 2024/0313929 | A1* | 9/2024 | Jung | H04L 1/1816 |
| 2024/0356677 | A1* | 10/2024 | Zhang | H04W 72/0446 |
| 2024/0364479 | A1* | 10/2024 | Wang | H04L 5/0048 |
| 2024/0389097 | A1* | 11/2024 | Yang | H04L 27/2601 |
| 2025/0097929 | A1* | 3/2025 | Lee | H04L 5/001 |

OTHER PUBLICATIONS

Intel Corporation: "Enhancements to HARQ for NR-unlicensed", R1-1902473 Intel HARQ, 3GPP TSG RAN WG1 Meeting #96, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 7 Pages, XP051600169, p. 5, 2nd par. under "Proposal 9".

International Search Report and Written Opinion—PCT/US2023/015929—ISA/EPO—Sep. 25, 2023.

OPPO: "Discussion on CBG-based (re)Transmission", R1-1718035, 3GPP TSG RAN WG1 Meeting #90bis, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, Sep. 30, 2017, 4 Pages, XP051352013, p. 3, par. 1.

OPPO: "Discussion on the Remaining Issues of HARQ Enhancements", R1-2008249, 3GPP TSG RAN WG1 #103-e, 3rd Generation Partnership Project , Mobile Competence Centre, 650, Route Des Lucioles, F-06921 Sophia-Antipolis Cedex, France, vol. RAN WG1, No. E-Meeting, Oct. 26, 2020-Nov. 13, 2020, Nov. 1, 2020, 5 Pages, XP052349607, p. 1-2, section 2.1.

Moderator (Nokia): "Moderator Summary #2 on HARQ-ACK Feedback Enhancements for NR Rel-17 URLLC/IIoT", 3GPP TSG-RAN WG1 Meeting #104-e, R1-2101818, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 175 Pages, Feb. 8, 2021, XP051977624, pp. 24-35, p. 77, property B, in table p. 77, property B, outside the table p. 77, property C, in table.

Nokia et al., "Remaining Issues on NR-U HARQ Scheduling and Feedback", 3GPP TSG RAN WG1 Meeting #101, R1-2004257, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, 11 Pages, May 15, 2020, XP051886010, p. 5, Proposal 6.

Partial International Search Report—PCT/US2023/015929—ISA/EPO—Jun. 19, 2023.

* cited by examiner

HYBRID AUTOMATIC REPEAT REQUEST CODEBOOK RETRANSMISSION

FIELD OF THE DISCLOSURE

Aspects of the present disclosure generally relate to wireless communication and to techniques and apparatuses for hybrid automatic repeat request (HARD) codebook retransmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
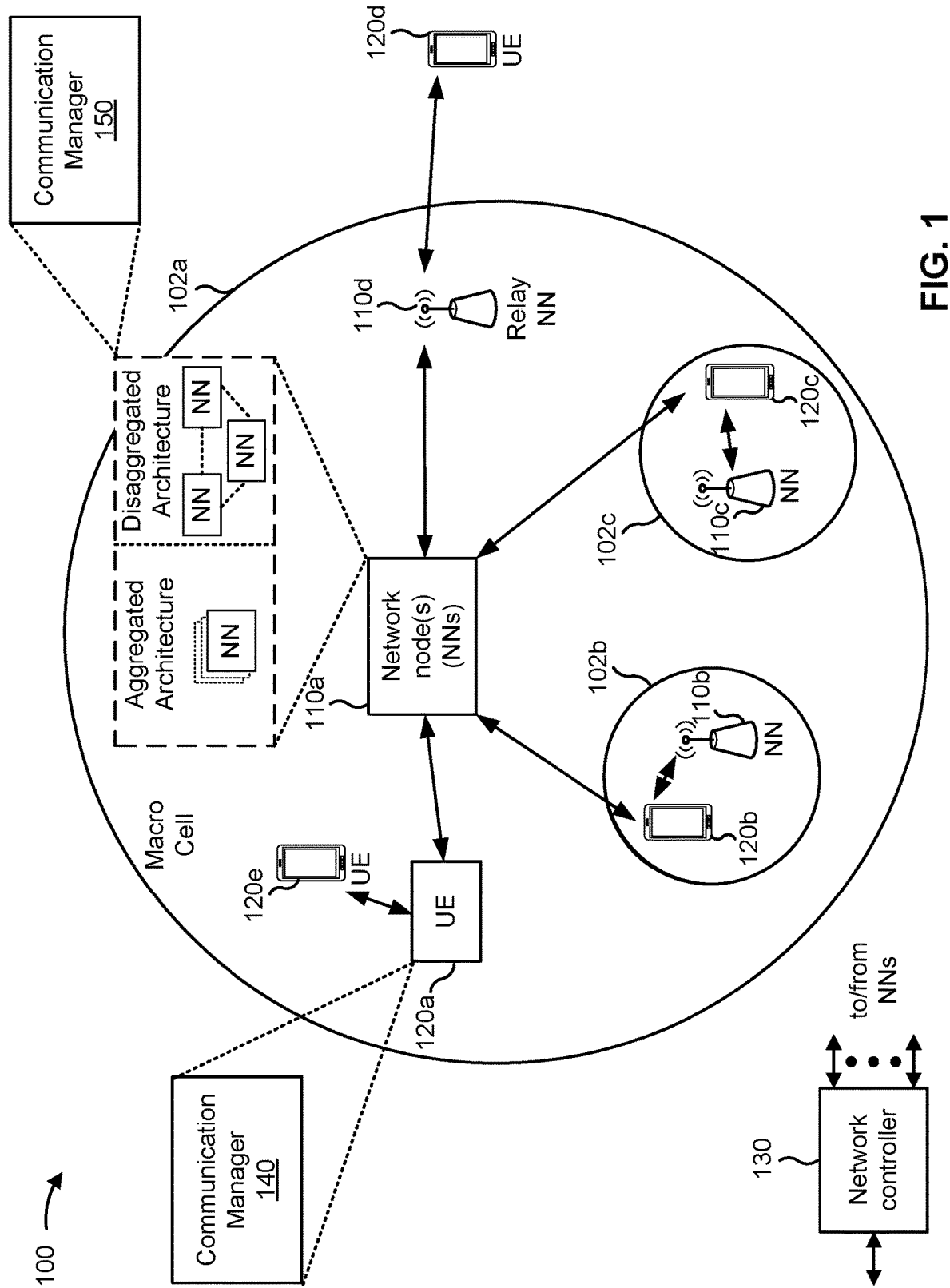
FIG. 1 is a diagram illustrating an example of a wireless network, in accordance with the present disclosure.

Some aspects described herein relate to a method of wireless communication performed by a user equipment (UE). The method may include receiving an indication to retransmit hybrid automatic repeat request (HARQ) feedback associated with an initial transmission on a first channel. The method may include transmitting a HARQ codebook associated with the HARQ feedback on a second channel, wherein the HARQ codebook is based at least in part on at least one of a first channel type of the first channel, or a second channel type of the second channel.

Some aspects described herein relate to a method of wireless communication performed by a network node. The method may include transmitting an indication to retransmit HARQ feedback associated with an initial transmission on a first channel. The method may include receiving a HARQ codebook associated with the HARQ feedback on a second channel, wherein the HARQ codebook is based at least in part on at least one of a first channel type of the first channel, or a second channel type of the second channel.

Some aspects described herein relate to a UE for wireless communication. The user equipment may include a memory and one or more processors coupled to the memory. The one or more processors may be configured to receive an indication to retransmit HARQ feedback associated with an initial transmission on a first channel. The one or more processors may be configured to transmit a HARQ codebook associated with the HARQ feedback on a second channel, wherein the HARQ codebook is based at least in part on at least one of a first channel type of the first channel, or a second channel type of the second channel.

Some aspects described herein relate to a network node for wireless communication. The network node may include a memory and one or more processors coupled to the memory. The one or more processors may be configured to transmit an indication to retransmit HARQ feedback associated with an initial transmission on a first channel. The one or more processors may be configured to receive a HARQ codebook associated with the HARQ feedback on a second channel, wherein the HARQ codebook is based at least in part on at least one of a first channel type of the first channel, or a second channel type of the second channel.

Some aspects described herein relate to a non-transitory computer-readable medium that stores a set of instructions for wireless communication by a UE. The set of instructions, when executed by one or more processors of the UE, may cause the UE to receive an indication to retransmit HARQ feedback associated with an initial transmission on a first channel. The set of instructions, when executed by one or more processors of the UE, may cause the UE to transmit a HARQ codebook associated with the HARQ feedback on a second channel, wherein the HARQ codebook is based at least in part on at least one of a first channel type of the first channel, or a second channel type of the second channel.

Some aspects described herein relate to a non-transitory computer-readable medium that stores a set of instructions for wireless communication by a network node. The set of instructions, when executed by one or more processors of the network node, may cause the network node to transmit an indication to retransmit HARQ feedback associated with an initial transmission on a first channel. The set of instructions, when executed by one or more processors of the network node, may cause the network node to receive a HARQ codebook associated with the HARQ feedback on a second channel, wherein the HARQ codebook is based at least in part on at least one of a first channel type of the first channel, or a second channel type of the second channel.

Some aspects described herein relate to an apparatus for wireless communication. The apparatus may include means for receiving an indication to retransmit HARQ feedback associated with an initial transmission on a first channel. The apparatus may include means for transmitting a HARQ codebook associated with the HARQ feedback on a second channel, wherein the HARQ codebook is based at least in part on at least one of a first channel type of the first channel, or a second channel type of the second channel.

Some aspects described herein relate to an apparatus for wireless communication. The apparatus may include means for transmitting an indication to retransmit HARQ feedback associated with an initial transmission on a first channel. The apparatus may include means for receiving a HARQ codebook associated with the HARQ feedback on a second channel, wherein the HARQ codebook is based at least in part on at least one of a first channel type of the first channel, or a second channel type of the second channel.

Aspects generally include a method, apparatus, system, computer program product, non-transitory computer-readable medium, user equipment, base station, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. As shown, a network node 110 may include one or more network nodes. For example, a network node 110 may be an aggregated network node, meaning that the aggregated network node is configured to utilize a radio protocol stack that is physically or logically integrated within a single node (for example, within a single device or unit). As another example, a network node 110 may be a disaggregated network node (sometimes referred to as a disaggregated base station), meaning that the network node 110 includes two or more non-co-located network nodes. A disaggregated network node may be configured to utilize a protocol stack that is physically or logically distributed among two or more nodes (such as one or more central units (CUs), one or more distributed units (DUs), or one or more radio units (RUs)).

In some examples, a network node 110 includes an entity that communicates with UEs 120 via a radio access link, such as an RU. In some examples, a network node 110 includes an entity that communicates with other network nodes 110 via a fronthaul link or a midhaul link, such as a DU. In some examples, a network node 110 includes an entity that communicates with other network nodes 110 via a midhaul link or a core network via a backhaul link, such as a CU. In some aspects, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another and/or to one or more other network nodes 110 in the wireless network 100 through various types of fronthaul, midhaul, or backhaul interfaces, such as a direct physical connection, an air interface, or a virtual network, using any suitable transport network.

In some aspects, a network node 110 may provide communication coverage for a particular geographic area. In the Third Generation Partnership Project (3GPP), the term "cell" can refer to a coverage area of a base station and/or a base station subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the network node 110a may be a macro base station for a macro cell 102a, the network node 110b may be a pico base station for a pico cell 102b, and the network node 110c may be a femto base station for a femto cell 102c. A base station may support one or multiple (e.g., three) cells.

As described herein, a node (which may be referred to as a node, a network node, a network entity, or a wireless node) may include, be, or be included in (e.g., be a component of) a network node (e.g., any network node described herein), a base station (e.g., any base station described herein), a UE (e.g., any UE described herein), a network controller, an apparatus, a device, a computing system, an integrated access and backhaul (IAB) node, a DU, a CU, an RU, and/or another processing entity configured to perform any of the techniques described herein. For example, a node may be a UE. As another example, a node may be a base station or network node. As another example, a first node may be configured to communicate with a second node or a third node. In one aspect of this example, the first node may be a UE, the second node may be a base station, and the third node may be a UE. In another aspect of this example, the first node may be a UE, the second node may be a base station, and the third node may be a base station. In yet other aspects of this example, the first, second, and third nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120 or network nodes 110. In the example shown in FIG. 1, the network node 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay node, a relay, or the like.

The wireless network 100 may be a heterogeneous network that includes network nodes 110 of different types, such as macro base stations, pico base stations, femto base stations, relay base stations, TRPs, RUs, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul or midhaul communication link. The network nodes 110 may communicate with one another directly or indirectly via a wireless or wireline backhaul communication link. In some aspects, the network controller 130 may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G NR systems, may be arranged in multiple manners with various components or constituent parts. In a 5G NR system, or network, a network node may be implemented in an aggregated or disaggregated architecture. For example, a network node, or one or more units (or one or more components) performing network node functionality, may be implemented as an aggregated network node (sometimes referred to as a standalone base station or a monolithic base station) or a disaggregated network node. "Network entity" or "network node" may refer to a disaggregated network node, an aggregated network node, or one or more entities of a disaggregated network node (such as one or more CUs, one or more DUs, one or more RUs, or a combination thereof).

In some aspects, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of network node functionality. For example, disaggregated network nodes may be utilized in an IAB network, an open radio access network (O-RAN) (such as the network configuration sponsored by the O-RAN Alliance), or a virtualized radio access network (vRAN, also known as a cloud radio access network (C-RAN)) to facilitate scaling of communication systems by separating base station functionality into one or more units that may be individually deployed. A disaggregated network node may include functionality implemented across two or more units at various physical locations, as well as functionality implemented for at least one unit virtually, which may enable flexibility in network design.

In some aspects, the UE 120 may include a communication manager 140. As described in more detail elsewhere herein, the communication manager 140 may receive an indication to retransmit hybrid automatic repeat request (HARQ) feedback associated with an initial transmission on a first channel; and transmit a HARQ codebook associated with the HARQ feedback on a second channel, wherein the HARQ codebook is based at least in part on at least one of: a first channel type of the first channel, or a second channel type of the second channel. Additionally, or alternatively, the communication manager 140 may perform one or more other operations described herein.

In some aspects, a network node may include a communication manager 150. As described in more detail elsewhere herein, the communication manager 150 may transmit an indication to retransmit HARQ feedback associated with an initial transmission on a first channel; and receive a HARQ codebook associated with the HARQ feedback on a second channel, wherein the HARQ codebook is based at least in part on at least one of: a first channel type of the first channel, or a second channel type of the second channel. Additionally, or alternatively, the communication manager 150 may perform one or more other operations described herein.

As indicated above, FIG. 1 is provided as an example. Other examples may differ from what is described with regard to FIG. 1.

Figure 2:
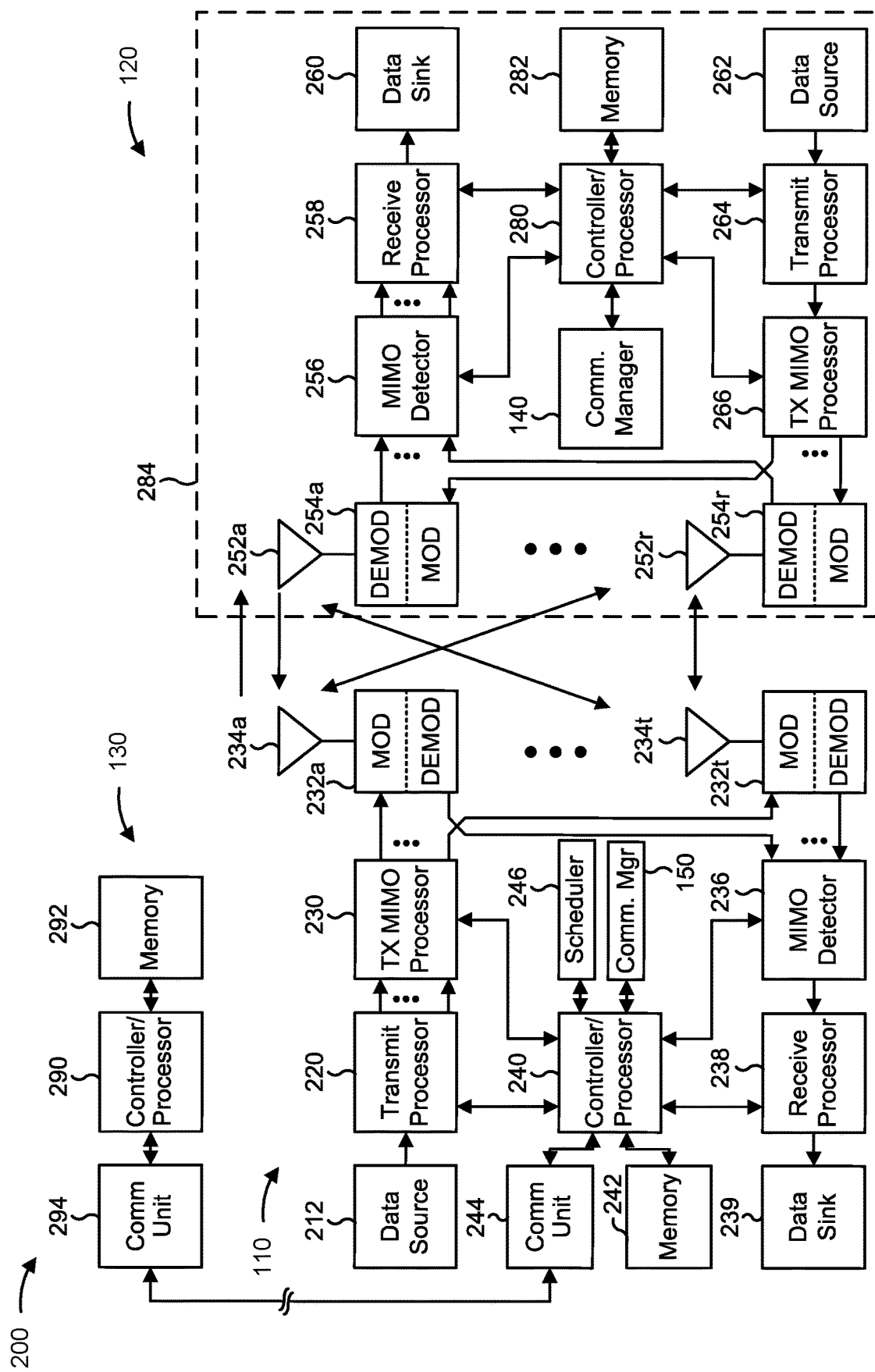
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. For example, some network nodes 110 may not include radio frequency components. In some aspects, one or more of transmit processor 220, TX MIMO processor 230, receive processor 238, MIMO detector 236, modem 232, or antenna 234 may be implemented separately from the network node 110 (such as at an RU associated with the network node 110 when the network node 110 is a CU or a DU).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the network node 110, the controller/processor 280 of the UE 120, and/or any other component(s) of FIG. 2 may perform one or more techniques associated with HARQ feedback, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for receiving an indication to retransmit HARQ feedback associated with an initial transmission on a first channel; and/or means for transmitting a HARQ codebook associated with the HARQ feedback on a second channel, wherein the HARQ codebook is based at least in part on at least one of: a first channel type of the first channel, or a second channel type of the second channel. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting an indication to retransmit HARQ feedback associated with an initial transmission on a first channel; and/or means for receiving a HARQ codebook associated with the HARQ feedback on a second channel, wherein the HARQ codebook is based at least in part on at least one of: a first channel type of the first channel, or a second channel type of the second channel. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
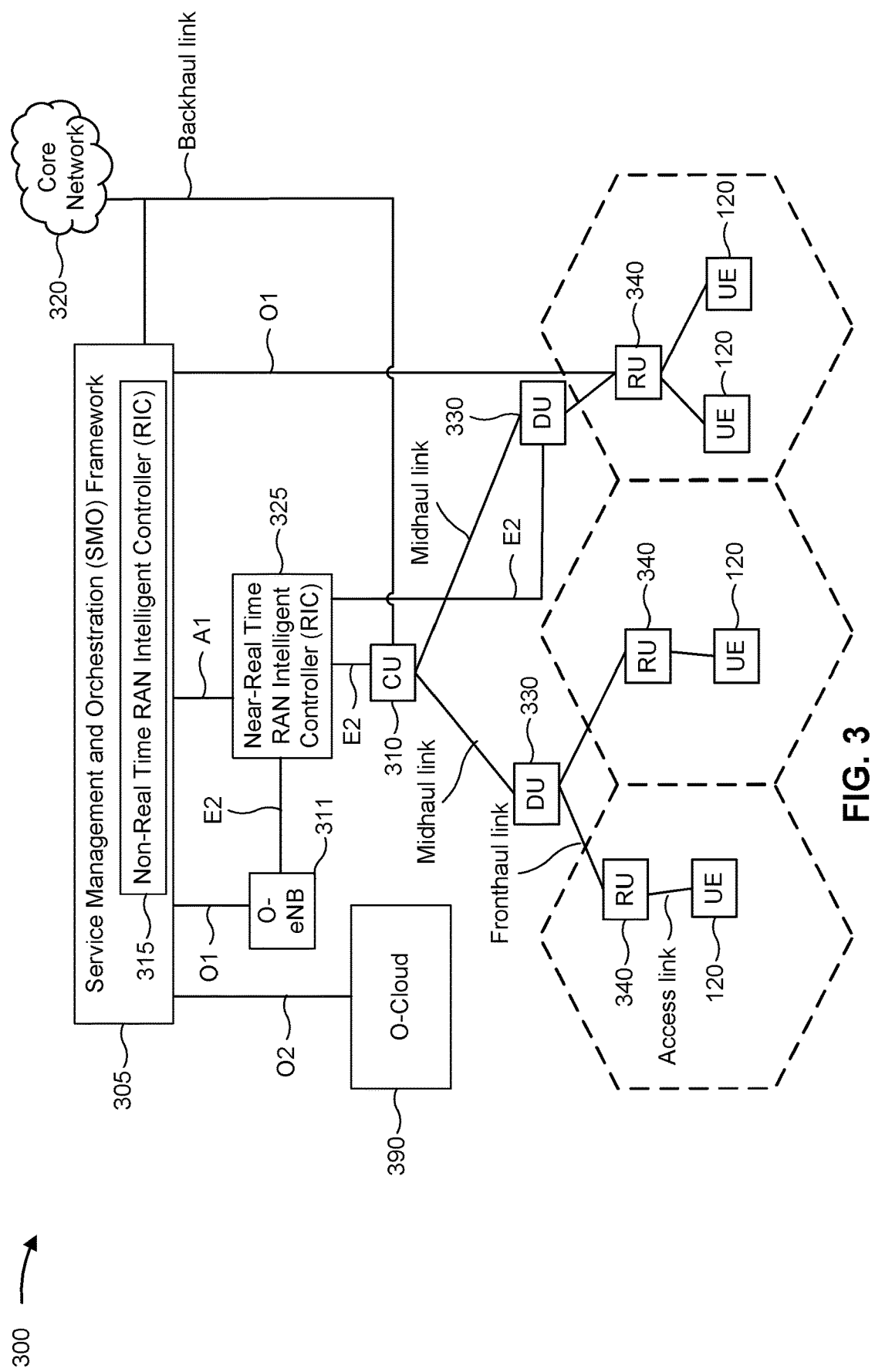
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts radio frequency (RF) processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As used herein, "network node" can refer to a CU 310, a DU 330, an RU 340, or a combination thereof.

As indicated above, FIG. 3 is provided as an example. Other examples may differ from what is described with regard to FIG. 3.

Figure 4:
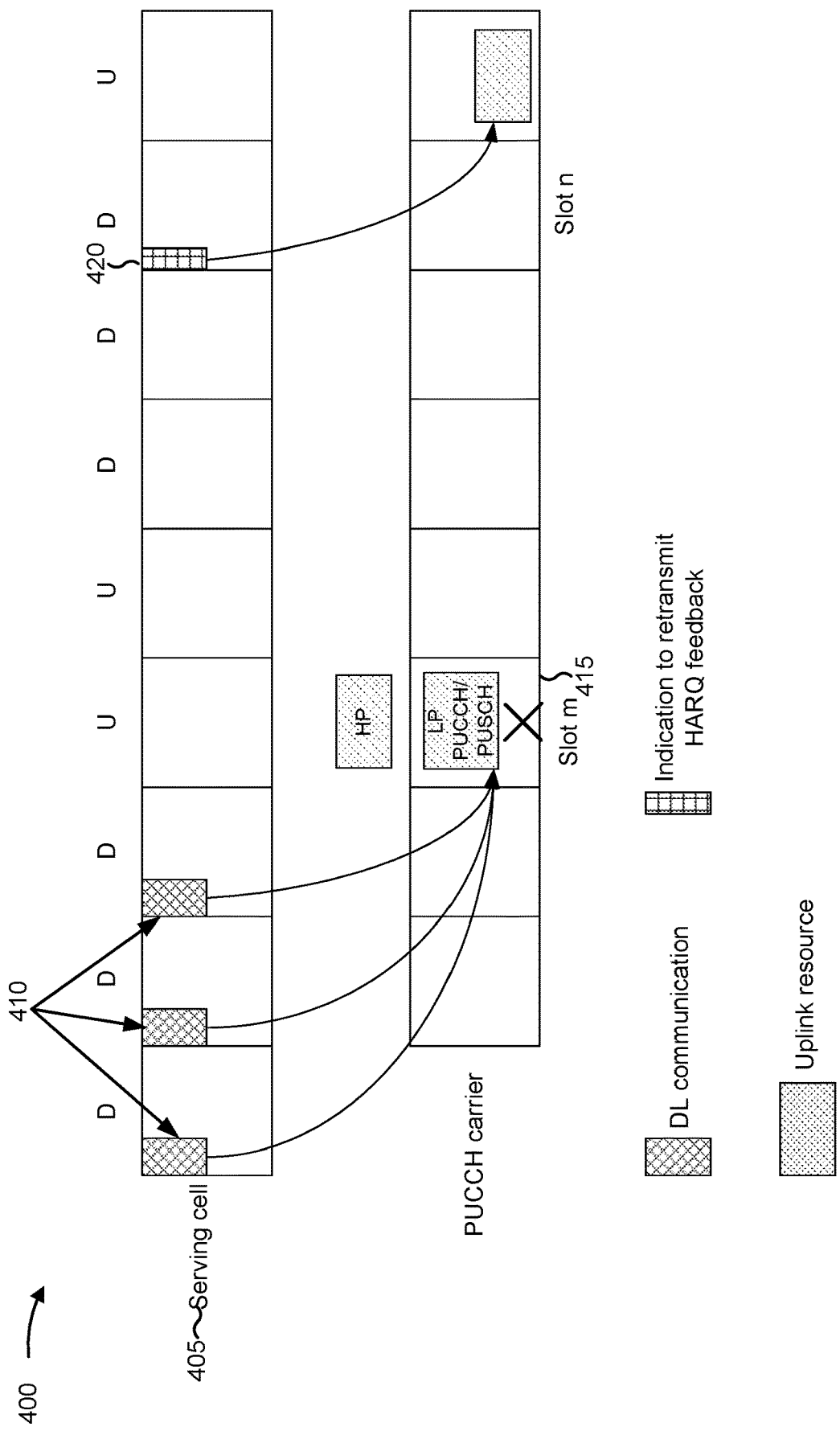
FIG. 4 is a diagram illustrating an example of retransmission of hybrid automatic repeat request (HARQ) feedback on a first channel and a second channel, in accordance with the present disclosure.

FIG. 4 is a diagram illustrating an example 400 of retransmission of HARQ feedback on a first channel and a second channel, in accordance with the present disclosure.

HARQ is a retransmission protocol. The receiver of a transmission (such as a UE receiving a downlink transmission) may check for errors in received data and, if an error is detected, may buffer the received data and request a retransmission from a transmitter of the transmission. The receiver can then combine the buffered data with the retransmitted data prior to channel decoding and error detection. This improves the performance of retransmission.

A UE may operate a downlink HARQ protocol. Downlink data may be transmitted on the physical downlink shared channel (PDSCH), and HARQ acknowledgments (ACKs) may be returned on either the physical uplink control channel (PUCCH) or the physical uplink shared channel (PUSCH). A serving cell, such as serving cell 405 (which may carry the PUCCH carrier associated with PUCCH transmission or may be a different cell than one that carries the PUCCH carrier), may have a HARQ entity (at the UE) and a configured set of HARQ processes. A single HARQ process can be associated with a number of transport blocks in the downlink. A network node may signal the identity of a HARQ process associated with a downlink transmission via downlink control information, such as with a downlink resource allocation for the downlink transmission.

HARQ feedback regarding a communication may be provided in accordance with a HARQ-ACK codebook (referred to herein as a HARQ codebook). A HARQ codebook defines a format used to signal a set of HARQ ACKs to the network node. If the UE transmits HARQ feedback using a format defined by a given HARQ codebook, the UE may be said to transmit the given HARQ codebook. A HARQ codebook can be semi-static with a size fixed by RRC configuration (referred to as a Type 1 codebook) or dynamic with a size that changes according to the number of resource allocations for which the HARQ codebook provides feedback (referred to as a Type 2 codebook).

FIG. 4 shows an example where an initial transmission of HARQ feedback regarding downlink communications 410 is scheduled to occur in a slot m, shown by reference number 415. As shown, a HARQ feedback transmission that is scheduled to be transmitted in a slot may be dropped or cancelled due to a conflict with a downlink symbol, or due to overlapping with another uplink transmission of a higher priority. In some cases, a high priority (HP) transmission (e.g., an uplink transmission that is associated with priority index 1) may conflict with a low priority (LP) transmission (e.g., an uplink transmission that is associated with priority index 0). For example, as shown, the HP transmission in slot m is prioritized over the LP transmission, carrying the HARQ feedback regarding the downlink communications 410, such that the transmission of the HARQ feedback is dropped in slot m.

The network node may transmit an indication 420 to trigger the UE 120 to retransmit the HARQ feedback in another slot. For example, the indication may be DCI (e.g., DCI format 1_1/1_2). As shown in the example 400, the HARQ-ACK transmission in the slot m may be dropped or cancelled, such as because of a conflict with a downlink symbol or a higher priority uplink transmission. The indication 420 may indicate for the UE 120 to retransmit the HARQ feedback that was dropped in slot m=n−x in slot n+k, where x and k are signaled in the indication 420. The retransmission of the HARQ feedback is shown by reference number 415 and can be on a PUCCH or a PUSCH.

The channel on which the initial transmission of the HARQ feedback was to occur (in the slot shown by reference number 415) may be referred to herein as a first channel. The first channel may have a first channel type, such as a PUCCH channel type or a PUSCH channel type. A PUSCH channel type indicates that the channel is a PUSCH, and a PUCCH channel type indicates that the channel is a PUCCH. The channel on which the retransmission of the HARQ feedback occurs may be referred to herein as a second channel. The second channel may have a second channel type, such as a PUCCH channel type or a PUSCH channel type.

The first channel type and the second channel type can be the same as one another or can be different from one another. In a first example, the first channel may be a PUCCH, and the second channel may be a PUCCH. In a second example, the first channel may be a PUCCH, and the second channel may be a PUSCH. In a third example, the first channel may be a PUSCH, and the second channel may be a PUCCH. In a fourth example, the first channel may be a PUSCH, and the second channel may be a PUSCH. Some aspects of constructing a HARQ codebook may be derived from a channel type associated with the HARQ codebook. However, in some of the above examples, the channel type of the initial transmission of the HARQ feedback (that is, the first channel type) can differ from the channel type of the retransmission of the HARQ feedback (that is, the second channel type). A difference in the channel type between the initial transmission and the retransmission can lead to ambiguity in how HARQ codebooks are constructed at the UE and interpreted at the network node, thereby causing failure of HARQ feedback, unnecessary retransmission, and/or misalignment of HARQ feedback with corresponding HARQ processes or downlink transmissions.

Some techniques described herein provide construction and processing of a HARQ codebook such that ambiguity associated with a difference between a first channel type and a second channel type is eliminated. For example, some techniques described herein specify which channel type, of a channel type associated with an initial transmission of HARQ feedback and a retransmission of HARQ feedback, should be used for construction and processing of a HARQ codebook associated with the retransmission of the HARQ feedback. Thus, ambiguity in HARQ codebook construction and processing (such as in the context of spatial bundling, codebook size determination, and indication of a missing downlink grant associated with an initial transmission of HARQ feedback) is eliminated. Furthermore, some techniques described herein specify a timeline for reception of an indication triggering retransmission of HARQ feedback, which reduces ambiguity in how DCI associated with an initial transmission and DCI associated with a retransmission should be interpreted. Thus, failure of HARQ feedback is reduced, unnecessary retransmission is reduced, and/or misalignment of HARQ feedback with corresponding HARQ processes or downlink transmissions is reduced.

As indicated above, FIG. 4 is provided as an example. Other examples may differ from what is described with regard to FIG. 4.

Figure 5:
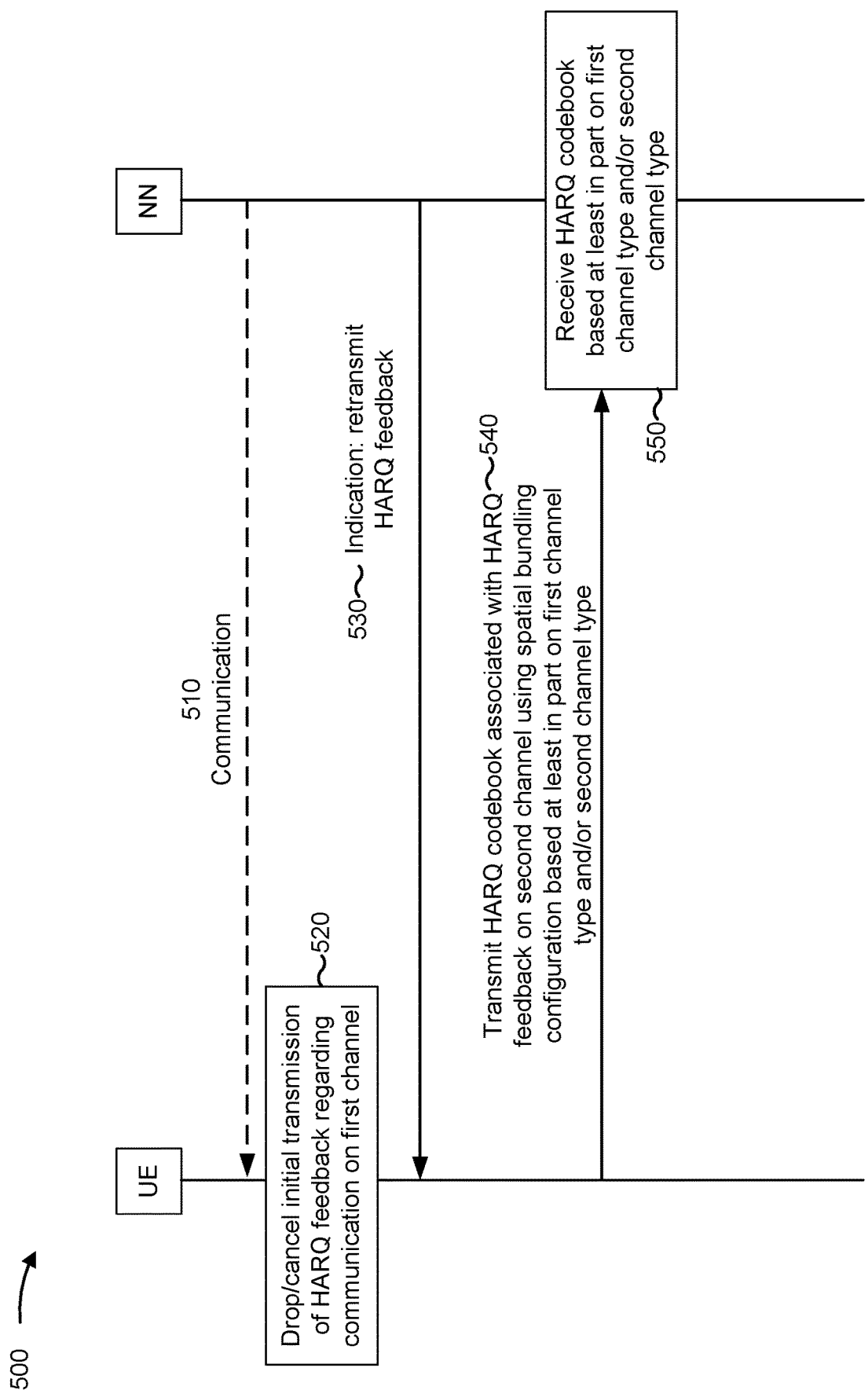
FIG. 5 is a diagram illustrating an example of determination of a spatial bundling configuration for HARQ feedback retransmission, in accordance with the present disclosure.

FIG. 5 is a diagram illustrating an example 500 of determination of a spatial bundling configuration for HARQ feedback retransmission, in accordance with the present disclosure. As shown, example 500 includes a network node (e.g., network node 110) and a UE (e.g., UE 120). In some aspects, the operations described with regard to example 500 (e.g., determination of a spatial bundling configuration for HARQ feedback retransmission) can be performed in conjunction with the operations described with regard to one or more of examples 600, 700, 702, 704, and 800.

A PDSCH can be configured with a number of TBs (e.g., up to two TBs), as mentioned above. To provide HARQ feedback regarding a PDSCH with two TBs, the UE may generate two HARQ-ACK bits, each HARQ-ACK bit corresponding to one of the two TBs. In this case, the UE may be configured (such as via RRC signaling) whether or not to spatially bundle the two HARQ-ACK bits via a parameter harq-ACK-SpatialBundlingPUCCH for HARQ feedback transmitted on a PUCCH, or a parameter harq-ACK-SpatialBundlingPUSCH for HARQ feedback transmitted on the PUSCH. Spatial bundling is a procedure for compressing HARQ feedback regarding multiple transport blocks (TBs). If two bits of HARQ feedback regarding two TBs are both ACKs, then the UE may transmit a HARQ codebook including a single bit indicating an ACK. If the two bits are not both ACKs, then the UE may transmit a HARQ codebook including a single bit indicating a negative ACK (NACK). A spatial bundling configuration is a configuration (such as harq-ACK-SpatialBundlingPUCCH or harq-ACK-SpatialBundlingPUSCH) indicating whether or not to bundle two or more HARQ-ACK bits corresponding to a PDSCH. However, in some scenarios, the spatial bundling configurations described above (harq-ACK-SpatialBundlingPUCCH or harq-ACK-SpatialBundlingPUSCH) may not provide sufficient information to determine whether or not bundling should be performed. For example, if an initial transmission of a HARQ codebook is transmitted using a different channel type than a retransmission of the HARQ codebook, ambiguity may arise regarding whether or not to perform bundling according to one of the above configurations (since the HARQ codebook was initially to be transmitted on a PUSCH and is later retransmitted on a PUCCH, or vice versa).

As shown in FIG. 5, and by reference number 510, the UE may receive, or may fail to receive, a communication from the network node. For example, the communication may include a PDSCH configured with multiple TBs. Thus, HARQ feedback regarding the PDSCH can include one bit (if spatial bundling is performed) or two bits (if spatial bundling is not performed).

As shown by reference number 520, an initial transmission of HARQ feedback regarding the communication may be dropped or cancelled. The initial transmission is on a first channel associated with a first channel type. In some aspects, the initial transmission may be dropped or cancelled due to a conflict with a downlink symbol or due to overlapping with another uplink transmission of a higher priority. In some aspects, the UE may transmit the initial transmission, but the initial transmission may fail (e.g., the network node may fail to receive the initial transmission).

As shown by reference number 530, the UE may receive an indication to retransmit the HARQ feedback associated with the initial transmission. For example, the indication may be DCI or may be received in DCI. As described with regard to FIG. 4, the indication may indicate a slot associated with the initial transmission and a slot in which the retransmission is to be performed. The retransmission may be on a second channel associated with a second channel type. In some aspects, the first channel type and the second channel type are the same channel type (e.g., the initial transmission and the retransmission are both on a PUSCH or both on a PUCCH). In some other aspects, the first channel type is different than the second channel type (e.g., the initial transmission is on a PUSCH and the retransmission is on a PUCCH, or vice versa). In cases where the first channel type is different than the second channel type, ambiguity may arise if harq-ACK-SpatialBundlingPUCCH or harq-ACK-SpatialBundlingPUSCH alone is used to determine the spatial bundling configuration, since a given HARQ feedback transmission is associated with a both a PUCCH and a PUSCH.

As shown by reference number 540, the UE may transmit a HARQ codebook associated with the HARQ feedback on the second channel. The HARQ codebook is based at least in part on at least one of the first channel type or the second channel type. For example, the UE may selectively perform bundling of the HARQ feedback based at least in part on at least one of the first channel type or the second channel type. In some aspects, the UE may selectively perform bundling of the HARQ feedback based at least in part on the first channel type being different than the second channel type and/or based at least in part on at least one of the first channel type or the second channel type.

In some aspects, the HARQ codebook uses a spatial bundling configuration corresponding to the second channel type. For example, the UE may apply spatial bundling according to the channel type of the channel on which the retransmitted HARQ codebook is transmitted (that is, the channel type of second channel). The spatial bundling configuration may be configured by the network node based at least in part on whether it is reliable enough to transmit the HARQ codebook unbundled on a particular channel type. Thus, it may be beneficial to follow the spatial bundling configuration associated with the channel type of channel in which the retransmission of the HARQ codebook is performed.

In some aspects, the HARQ codebook uses a spatial bundling configuration corresponding to the first channel type. For example, the retransmission of the HARQ codebook may use the same spatial bundling configuration as the initial transmission of the HARQ codebook. In other words, the spatial bundling configuration for the retransmission may be determined based at least in part on the first channel type associated with the initial transmission of the HARQ codebook. Determining the spatial bundling configuration based at least in part on the first channel type may be less computationally complex than changing the spatial bundling configuration between the initial transmission and the retransmission, since the UE does not need to regenerate the HARQ codebook for the retransmission (such as using a different spatial bundling configuration than the initial transmission). That is, the UE can simply save the original HARQ codebook in memory, and then can retransmit the original HARQ codebook when triggered by the network node.

In some aspects, the spatial bundling configuration of the HARQ codebook is based at least in part on whether the HARQ codebook is a dynamic HARQ codebook or a semi-static HARQ codebook. For example, the UE may determine whether to perform bundling based at least in part on whether the retransmitted HARQ codebook is a dynamic codebook or a semi-static codebook. As another example, the HARQ codebook may use a spatial bundling configuration corresponding to the second channel type if the HARQ codebook is a semi-static codebook (e.g., Type 1), and may use a spatial bundling configuration corresponding to the first channel type if the HARQ codebook is a dynamic HARQ codebook (e.g., Type 2). As yet another example, the HARQ codebook may use a spatial bundling configuration corresponding to the first channel type if the HARQ codebook is a semi-static codebook (e.g., Type 1), and may use a spatial bundling configuration corresponding to the second channel type if the HARQ codebook is a dynamic HARQ codebook (e.g., Type 2).

In some aspects, a spatial bundling configuration of the HARQ codebook is based at least in part on whether the first channel type is different than the second channel type. For example, the spatial bundling configuration may be based at least in part on whether the retransmission uses a PUSCH or a PUCCH and the initial transmission uses a PUCCH or a PUSCH, respectively. In some examples, the HARQ codebook may use a spatial bundling configuration corresponding to the second channel type if the initial transmission uses a PUSCH and the retransmission uses a PUCCH, and the HARQ codebook may use a spatial bundling configuration corresponding to the first channel type if the initial transmission uses a PUCCH and the retransmission uses a PUSCH.

In some aspects, a spatial bundling configuration of the retransmission of the HARQ codebook follows a fixed rule for spatial bundling (e.g., regardless of the type of the first/second channel). For example, the UE may always perform spatial bundling for retransmission. As another example, the UE may always transmit the HARQ feedback unbundled for retransmission. Always performing spatial bundling may reduce the memory size (for example, since the UE always saves the bundled results, regardless of the actual configuration the UE receives from the network node regarding the first channel or second channel), which facilitates hardware dimensioning (which has to be designed in view of the worst case for memory usage).

As shown by reference number 550, the network node may receive the retransmission of the HARQ codebook. The network node may receive (e.g., process, interpret, etc.) the HARQ codebook based at least in part on at least one of the first channel type or the second channel type. For example, the network node may receive the HARQ codebook in accordance with a spatial bundling configuration determined as described with regard to reference number 540. In some aspects, the network node may retransmit the communication of reference number 510 based at least in part on the HARQ codebook. In some other aspects, the network node may determine that retransmission is not needed based at least in part on the HARQ codebook. In some aspects, the network node may schedule the retransmission (such as using a parameter based at least in part on the HARQ codebook) based at least in part on the HARQ feedback.

As indicated above, FIG. 5 is provided as an example. Other examples may differ from what is described with regard to FIG. 5.

Figure 6:
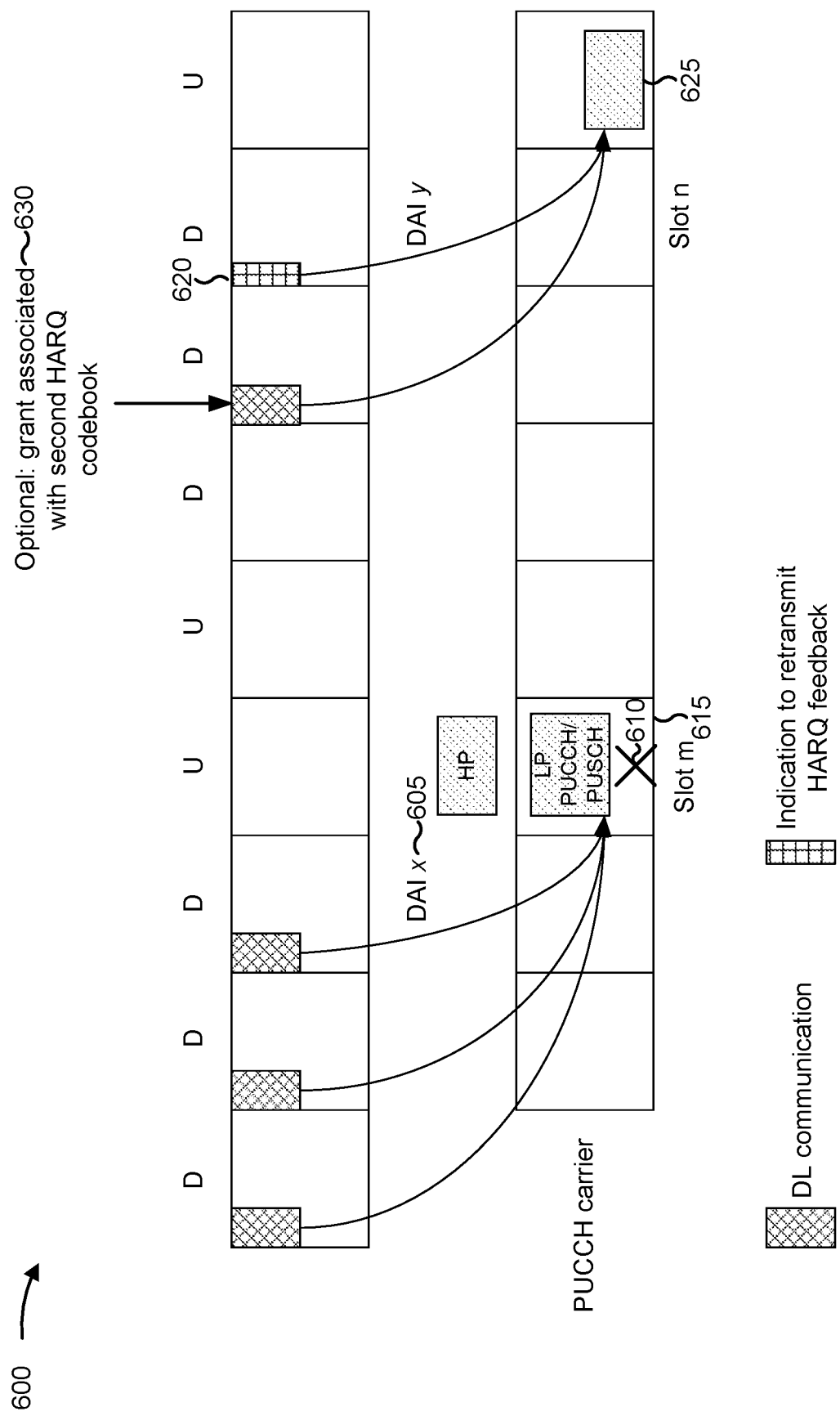
FIG. 6 is a diagram illustrating an example of determination of a codebook size for HARQ feedback retransmission, in accordance with the present disclosure.

FIG. 6 is a diagram illustrating an example 600 of determination of a codebook size for HARQ feedback retransmission, in accordance with the present disclosure. As shown, example 600 includes a UE (e.g., UE 120) and a network node (e.g., network node 110). In some aspects, the operations described with regard to example 600 (e.g., determining a payload size of a HARQ codebook based at least in part on a first channel type and/or a second channel type) can be performed in conjunction with the operations described with regard to one or more of examples 500, 700, 702, 704, and 800.

Example 600 relates to the determination of a payload size of a HARQ codebook. A payload size of a HARQ codebook defines how many HARQ-ACK bits the HARQ codebook includes. For example, a HARQ codebook including 3 HARQ-ACK bits has a payload size of 3 bits. Generally, for an initial transmission of a HARQ codebook, the payload size of the HARQ codebook is determined by a downlink assignment index (DAI) (such as a total DAI) of a most recently received downlink grant (if the HARQ codebook is transmitted on a PUCCH corresponding to the downlink grant) or a most recently received uplink grant (if the HARQ codebook is transmitted on a PUSCH scheduled by the uplink grant).

A DAI may be received in DCI. A DAI can be a counter DAI or a total DAI. A counter DAI may indicate a cumulative number of serving cell and physical downlink control channel (PDCCH) monitoring occasion pairs in which DCIS have been sent by the base station, up to the current serving cell and current PDCCH monitoring occasion. A total DAI may be used when multiple serving cells are present, such as in carrier aggregation. The total DAI may indicate the total number of serving cell and PDCCH monitoring occasions in which DCIS have been transmitted by the base station, up to the current PDCCH monitoring occasion. Thus, the same total DAI value may be used for all DCIS in the same PDCCH monitoring occasion. This provides protection against missing a DCI corresponding to the last serving cell in a particular PDCCH monitoring occasion, since the total DAI would inform the UE that one more DCI is to be expected than has been received according to the counter DAI.

If no DCI is missed, then HARQ-ACK bits corresponding to the received communications may be placed in a codebook in the same order as the counter DAI. If a DCI is missed, then a NACK may be placed in the codebook in the position corresponding to the counter DAI of the missed DCI. The UE may determine whether a DCI is missed by comparing consecutive counter DAI values (for example, counter DAI values of 0, then 1, then 3 may indicate that a DCI with a counter DAI value of 2 was missed) or by comparing total DAIS and counter DAIS of all DCIS in a given PDCCH monitoring occasion. The UE may generate HARQ feedback based at least in part on the codebook and may provide the HARQ feedback to a base station. Thus, a UE may identify DCI that has been missed and may generate HARQ feedback based at least in part on counter DAIS and total DAIS.

Ambiguity may arise when determining a payload size for a retransmission of HARQ feedback. For example, as mentioned above, a HARQ codebook associated with an initial transmission of the HARQ feedback may sometimes use a payload size as indicated by the DAI of the last downlink grant or the last uplink grant. However, the retransmission of the HARQ feedback may be associated with a grant (such as a downlink grant or an uplink grant) with a different DAI than a grant associated with the initial transmission of the HARQ feedback. If there is not a common definition of which DAI should be used to define the payload size of the HARQ codebook, then the UE and the network node may have different understandings of the payload size of the HARQ codebook, leading to failure of the HARQ mechanism. Techniques described with regard to example 600 define a DAI (such as a DAI associated with the initial transmission, a DAI associated with the retransmission, or both) used to determine a payload size of the HARQ codebook.

As shown by reference number 605, an initial transmission of a HARQ codebook is associated with a DAI x, indicated by DCI received in slot m−1. As shown by reference number 610, the initial transmission is dropped or cancelled in slot m (indicated by reference number 615). An indication to retransmit HARQ feedback, shown by reference number 620, may be associated with a DAI y. x can be the same DAI value as y, or can be a different DAI value than y. The retransmission of the HARQ feedback, including a HARQ codebook based at least in part on the HARQ feedback (sometimes referred to in example 600 as a retransmission HARQ codebook) is shown by reference number 625.

In some aspects, a payload size of the HARQ codebook corresponds to a DAI provided in the indication to retransmit the HARQ feedback shown by reference number 620. In this example, the payload size may be determined according to the DAI y. Determining the payload size according to the DAI provided in the indication may align understanding between the UE and the network node, since if the UE determines to transmit a communication via the second channel with the retransmitted HARQ codebook, it means that the UE did not miss the grant associated with the retransmission of the HARQ codebook (that is, the indication shown by reference number 620); hence, using the DAI indicated by the grant associated with the retransmission may avoid misunderstanding between the UE and the network node.

In some aspects, a payload size of the HARQ codebook corresponds to a DAI provided in a grant associated with the initial transmission. In this example, the payload size may be determined according to the DAI x shown by reference number 605. Determining the DAI according to the DAI provided in a grant associated with the initial transmission of the HARQ codebook may conserve processor resources of the UE that would otherwise be used to reconstruct the HARQ codebook according to a different DAI and payload size.

In some examples, the retransmission HARQ codebook may be transmitted in together with another HARQ codebook (referred to in example 600) as a second HARQ codebook. For example, the retransmission HARQ codebook and the second HARQ codebook may be multiplexed for transmission on the second channel. The second HARQ codebook may be associated with a grant, shown by reference number 630. For example, the grant shown by reference number 630 may trigger transmission of HARQ feedback in the slot n+1. In some cases, ambiguity may arise regarding which value the DAI associated with the indication shown by reference number 620 should indicate, which can lead to failure of the HARQ mechanism between the UE and the network node.

In some aspects, the DAI provided in the indication shown by reference number 620 corresponds to a payload size of the second HARQ codebook. For example, the indication may only indicate the payload size of the second HARQ codebook.

In some aspects, the DAI provided in the indication shown by reference number 620 corresponds to a payload size of the retransmission HARQ codebook. For example, the indication may only indicate the payload size of the retransmission HARQ codebook.

In some aspects, the DAI provided in the indication shown by reference number 620 corresponds to a payload size of the retransmission HARQ codebook and a payload size of the second HARQ codebook. For example, the indication may indicate the payload size of both the second HARQ codebook and the retransmitted HARQ codebook. In some aspects, for a dynamic HARQ codebook (e.g., when the second HARQ codebook and/or the retransmission HARQ codebook are a Type 2 HARQ codebook), the UE may insert one or more dummy bits in the dynamic HARQ codebook such that the second HARQ codebook and the retransmission HARQ codebook are both consistent with the DAI provided in the indication shown by reference number 620. That is, the size of the second HARQ codebook and the retransmission HARQ codebook may both be equal to the DAI after taking modulo $2^{T_D}$ (two to the power of $T_D$), where $T_D$ denotes the bitwidth of the total DAI in the indication shown by reference number 620. For example, modulo(actual payload size of second HARQ codebook, 4) may be equal to modulo(retransmission HARQ codebook size, 4) and to the DAI.

As mentioned above, in some aspects, the DAI provided in the indication shown by reference number 620 corresponds to a payload size of the retransmission HARQ codebook and a payload size of the second HARQ codebook. For example, the DAI provided in the indication may indicate a sum of a payload size of the second HARQ codebook and the retransmission HARQ codebook.

In the above examples regarding determination of a DAI for multiplexed HARQ codebooks, if the second channel is a PUCCH, then the DAI may be provided in the last DCI that schedules the transmission (e.g., the final PUCCH) of the multiplexed HARQ codebooks on the second channel. For example, the indication shown by reference number 620 may be the last DCI that schedules the transmission.

The UE may transmit, and the network node may receive, a communication on the second channel shown by reference number 625. If the retransmission HARQ codebook is multiplexed with the second HARQ codebook, the communication may include the retransmission HARQ codebook and the second HARQ codebook. The UE may construct the retransmission HARQ codebook and/or the second HARQ codebook based at least in part on a DAI, such as the DAI x or the DAI y, as described above. The network node may receive (e.g., process) the retransmission HARQ codebook and/or the second HARQ codebook based at least in part on the DAI used to construct the retransmission HARQ codebook and/or the second HARQ codebook.

As indicated above, FIG. 6 is provided as an example. Other examples may differ from what is described with regard to FIG. 6.

Figure 7:
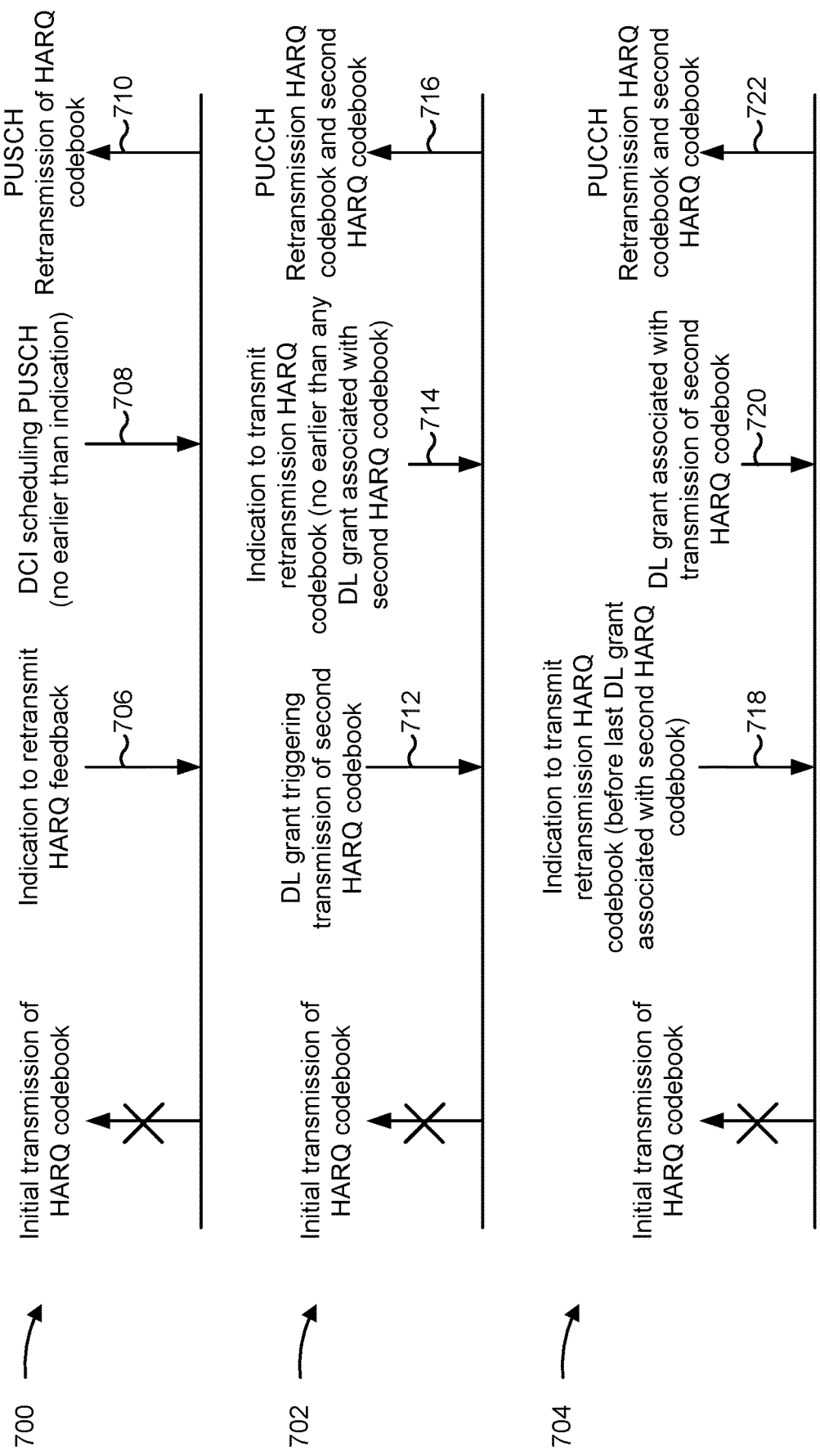
FIG. 7 is a diagram illustrating examples of a timeline associated with HARQ feedback retransmission, in accordance with the present disclosure.

FIG. 7 is a diagram illustrating examples 700, 702, and 704 of a timeline associated with HARQ feedback retransmission, in accordance with the present disclosure. As shown, example 700 includes a UE (e.g., UE 120) and a network node (e.g., network node 110). In some aspects, the operations described with regard to examples 700, 702, and/or 704 (e.g., application of a timeline associated with HARQ feedback retransmission) can be performed in conjunction with the operations described with regard to one or more of examples 500, 600, and 800.

As shown, in each of examples 700, 702, and 704, an initial transmission of a HARQ codebook associated with HARQ feedback is dropped or cancelled. Example 700 provides an example timeline for transmission/reception of an indication to retransmit the HARQ feedback and DCI scheduling the second channel for the retransmission of the HARQ feedback. Examples 702 and 704 provide example timelines associated with multiplexing a retransmission HARQ codebook (that is, the HARQ codebook indicating the HARQ feedback associated with the initial transmission) and a second HARQ codebook in a communication using a PUCCH.

In example 700, an indication to retransmit HARQ feedback is shown by reference number 706. A DCI message (e.g., an uplink grant) scheduling a PUSCH 710 for retransmission of the HARQ feedback is shown by reference number 708. As shown, in example 700, the DCI message shown by reference number 708 arrives no earlier than the indication shown by reference number 706. For example, if the retransmitted HARQ codebook is transmitted on a PUSCH scheduled by a DCI message (that is, an uplink grant), then the DCI message associated with the PUSCH shall not come earlier than the downlink DCI message (e.g., the indication shown by reference number 706) that triggers the HARQ codebook retransmission. This may be useful since the uplink grant indicates the DAI that the UE will use to determine the payload size of the retransmitted HARQ codebook, and the uplink grant will indicate a beta-offset value, which is used by the UE to determine the number of resources used on the PUSCH to transmit the retransmitted HARQ codebook (and potentially other uplink control information (UCI)). For example, the beta-offset value may be set by the network node based at least in part on a size of the HARQ feedback up to the time at which the DCI message shown by reference number 708 is sent. Thus, if the DCI message shown by reference number 708 arrives earlier than the indication shown by reference number 706, the DCI may not indicate sufficient resource for the retransmitted HARQ codebook shown by reference number 710.

As mentioned above, in examples 702 and 704, the second channel used to transmit the retransmission of the HARQ feedback (referred to in examples 702 and 704 as a retransmission HARQ codebook) is a PUCCH. As shown in example 702, and by reference number 712, the UE may receive a downlink grant triggering transmission of a second HARQ codebook. As shown by reference number 714, the UE may receive an indication to retransmit the HARQ feedback (such as via the retransmission HARQ codebook). As further shown, the indication shown by reference number 714 is received by the UE (and transmitted by the network node) no earlier than any downlink grant associated with the second HARQ codebook (such as the downlink grant shown by reference number 712). For example, the indication shown by reference number 714 may be transmitted by the network node and received by the UE only after all the downlink grant(s) that triggers the second HARQ codebook transmission. In example 702, a PUCCH resource for the transmission of the second HARQ codebook and the retransmission HARQ codebook (shown by reference number 716) may be indicated by a PUCCH resource indicator (PRI) in the indication shown by reference number 714, and the UE may use a DAI of the indication shown by reference number 714 to determine the size of the second HARQ codebook. Thus, the network node that transmits the indication and the downlink grant can ensure that the grant for the PUCCH is sufficiently reliable to carry the second HARQ codebook and the retransmission HARQ codebook.

As shown in example 704, and by reference number 718, the UE may receive an indication to retransmit the HARQ feedback (such as via the retransmission HARQ codebook). As shown by reference number 720, the UE may receive a downlink grant triggering transmission of a second HARQ codebook. As further shown, the indication to retransmit the HARQ feedback shown by reference number 718 may arrive before a last downlink grant associated with the second HARQ codebook (such as the downlink grant shown by reference number 720). For example, the indication may be transmitted by the network node and received by the UE before the last downlink grant that triggers the second HARQ codebook transmission. In example 704, a PUCCH resource for the transmission of the second HARQ codebook and the retransmission HARQ codebook (shown by reference number 722) is indicated by the downlink grant shown by reference number 720.

As indicated above, FIG. 7 is provided as an example. Other examples may differ from what is described with regard to FIG. 7.

Figure 8:
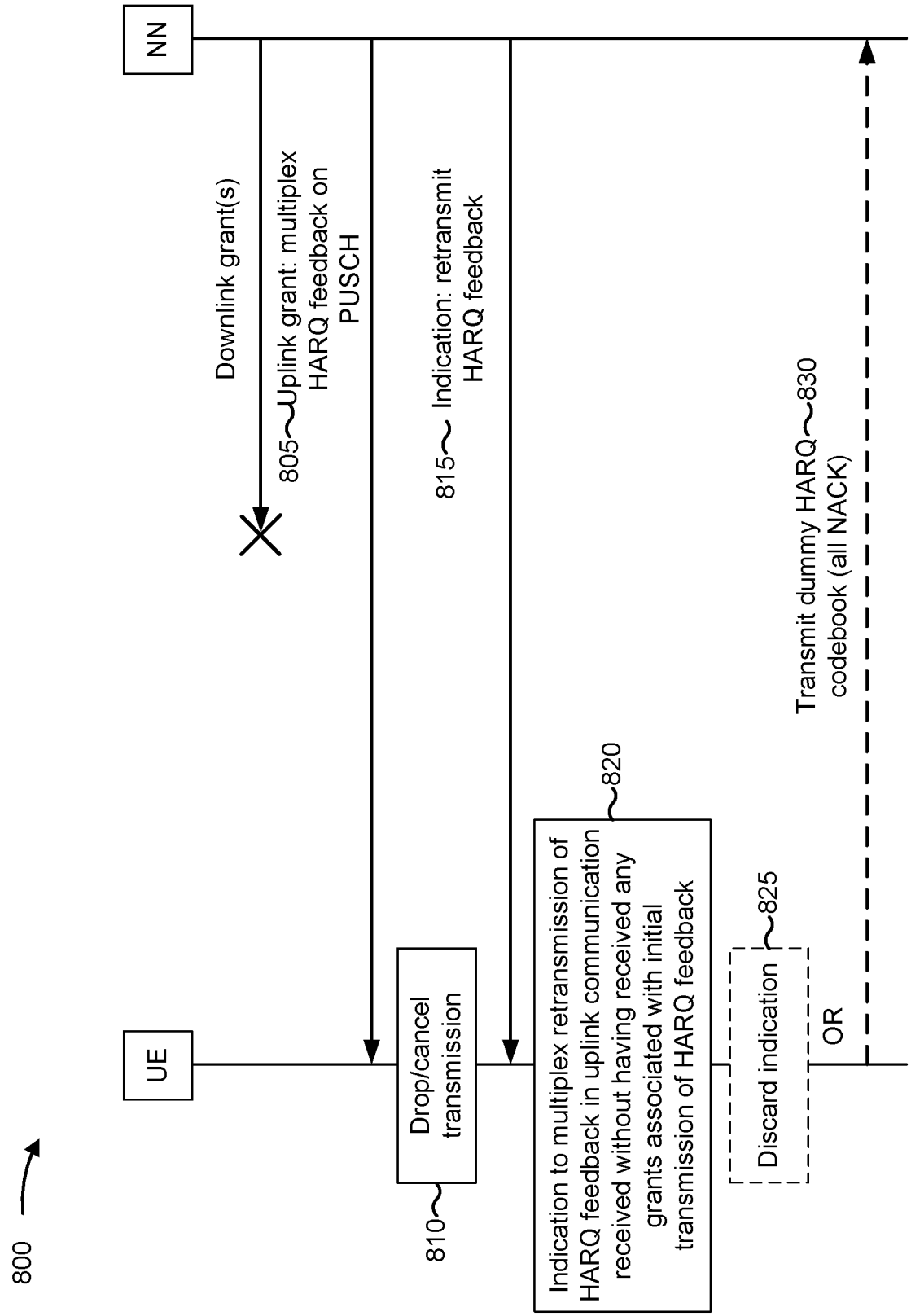
FIG. 8 is a diagram illustrating an example of indication of a missed downlink grant associated with HARQ feedback retransmission, in accordance with the present disclosure.

FIG. 8 is a diagram illustrating an example 800 of indication of a missed downlink grant associated with HARQ feedback retransmission, in accordance with the present disclosure. As shown, example 800 includes a UE (e.g., UE 120) and a network node (e.g., network node 110). In some aspects, the operations described with regard to example 800 (e.g., indication of a missed downlink grant associated with HARQ feedback retransmission) can be performed in conjunction with the operations described with regard to one or more of examples 500, 600, 700, 702, and 704. Example 800 relates to a case where all downlink grants associated with an initial transmission of a HARQ codebook (such as all downlink grants for PDSCHs associated with the HARQ codebook) are missed, but the UE receives an uplink grant that indicates for the UE to multiplex the HARQ codebook on a PUSCH (such as through an indication in an uplink DAI). Thus, the UE may determine that HARQ feedback is requested but the UE has not received any downlink grant for which to provide HARQ feedback. This may occur, for example, for dynamic HARQ codebook transmission on a PUSCH with an uplink DAI not equal to 4, or for semi-static HARQ codebook transmission when the uplink DAI (e.g., a total DAI (tDAI)) is equal to 1. For example, for a dynamic codebook, if DAI is equal 4, since 4 mod 4=0, and if the UE has not received any downlik grant, then the UE may assume that the network node does not request the UE to report HARQ-ACK feedback on the PUSCH. Similarly, for a semi-static codebook, a tDAI of 1 means that the UE shall transmit HARQ-ACK feedback on a PUSCH, whereas a tDAI of 0 means that the UE shall not transmit HARQ-ACK on PUSCH.

As shown by reference number 805, the UE may receive, from the network node, an uplink grant. The uplink grant may indicate to multiplex HARQ feedback (e.g., an initial transmission of HARQ feedback) on a PUSCH, such as based at least in part on an uplink DAI of the uplink grant. For example, the uplink grant may schedule the PUSCH for HARQ codebook transmission. However, the UE may not receive one or more downlink grants for PDSCHs associated with the HARQ codebook. In some aspects, the UE may identify that the one or more downlink grants associated with the initial transmission of the HARQ feedback are missing, such as based at least in part on DAIs associated with the one or more downlink grants and a DAI indicated by the uplink grant.

As shown by reference number 810, the UE may drop or cancel the initial transmission of the HARQ feedback, as described elsewhere herein. As shown by reference number 820, the UE may receive an indication, shown by reference number 815, to multiplex retransmission of the HARQ feedback in an uplink communication, without the UE having received any grants associated with the initial transmission of the HARQ feedback. In some aspects, the indication may indicate to retransmit the HARQ feedback on a PUCCH (e.g., the indication may be or include a downlink grant). In some other aspects, the indication may indicate to retransmit the HARQ feedback on a PUSCH (e.g., the indication may be or include an uplink grant).

As shown by reference number 825, in some aspects, the UE may discard the indication shown by reference number 815. For example, the UE may discard the indication (e.g., the uplink grant or the downlink grant) based at least in part on not having received any grants (e.g., downlink grants) associated with the initial transmission of the HARQ feedback (e.g., the UE may discard the indication based at least in part on identifying that one or more grants associated with the initial transmission of the HARQ feedback are missing). In some aspects, the UE may not transmit the uplink communication carrying the retransmission of the HARQ feedback. For example, the UE may drop a PUCCH (e.g., before performing intra-UE multiplexing with other PUCCHs (including channel state information, HARQ feedback, a scheduling request, or the like) and/or PUSCHs). This option (e.g., dropping the PUSCH carrying the retransmission) may be used when the retransmission occurs on a PUCCH. For example, if the UE does not transmit any feedback, the network node may detect that the UE does not transmit any feedback, and the network node may determine that there is a problem associated with the initial transmission of the HARQ-ACK feedback. Thus, the network node can identify the HARQ-ACK feedback to be interpreted as a NACK. In this case, there is no misunderstanding between UE and network node when UE does not transmit the PUCCH.

In some aspects, the UE may transmit the uplink communication, omitting the retransmission of the HARQ feedback. For example, the UE may not multiplex the retransmitted HARQ codebook on a PUSCH of the uplink communication.

As shown by reference number 830, in some aspects, the UE may transmit a dummy HARQ codebook. A dummy HARQ codebook is a HARQ codebook indicating all NACKs. In some aspects, the UE and/or the network node may determine a payload size of the dummy HARQ codebook. For example, the payload size may have a fixed (e.g., default) value (such as 1 bit, 2 bits, or the like). As another example, the payload size may be determined in accordance with an uplink DAI of the uplink grant (shown by reference number 805) associated with the initial transmission of the HARQ codebook. As yet another example, the payload size may be determined in accordance with a downlink DAI of a downlink grant associated with the retransmitted HARQ codebook (e.g., the indication shown by reference number 815). As still another example, the payload size may be determined in accordance with an uplink DAI of an uplink grant associated with the retransmitted HARQ codebook (e.g., the indication shown by reference number 815). As yet another example, the payload size may be determined according to one or more techniques described with regard to FIG. 6, above. The transmission of the dummy HARQ codebook may be based at least in part on at least one of the first channel type or the second channel type, since the determination that one or more grants are missed may be based at least in part on the uplink grant shown by reference number 805 being associated with a PUSCH (e.g., the first channel type being a PUSCH).

Transmitting a dummy HARQ codebook is beneficial when the retransmission of the HARQ codebook is on a PUSCH. In this case, whether the HARQ-ACK codebook is transmitted on the PUSCH or not may affect the transmission of the PUSCH, since the PUSCH may rate match around the HARQ-ACK codebook (from the network node's perspective). Sending a dummy HARQ-ACK codebook (with a size that is agreed between or known to the UE and the network node) improves the likelihood that the PUSCH transmission is correctly decoded/received by the network node.

In some aspects, the transmission of the dummy HARQ codebook may collide with transmission on another channel, such as a PUSCH or a PUCCH (meaning that a resource for transmission of the dummy HARQ codebook overlaps with a resource for transmission on the other channel). In such examples, the UE may (e.g., shall) multiplex the dummy HARQ codebook with UCI associated with the other channel, or may multiplex the dummy HARQ codebook in the PUSCH.

In some aspects, the UE may determine a transmit power for the dummy HARQ codebook. For example, the UE may determine the transmit power based at least in part on a default number of bits (e.g., a default payload size) and a total number of HARQ-ACK bits in the retransmission HARQ codebook (which may be determined according to a DAI of the indication shown by reference number 815 or the uplink grant shown by reference number 805).

As indicated above, FIG. 8 is provided as an example. Other examples may differ from what is described with regard to FIG. 8.

Figure 9:
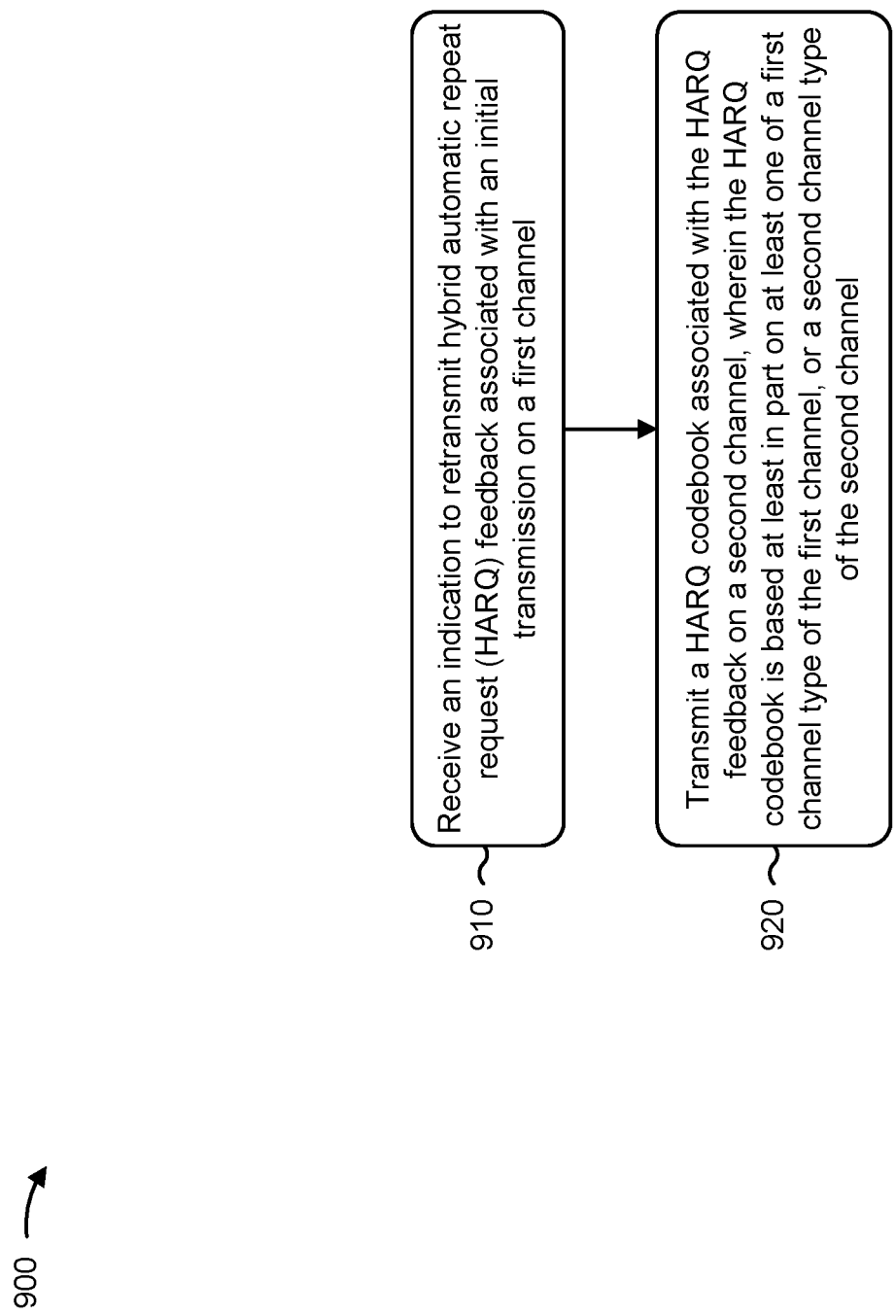
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with HARQ codebook retransmission.

As shown in FIG. 9, in some aspects, process 900 may include receiving an indication to retransmit HARQ feedback associated with an initial transmission on a first channel (block 910). For example, the UE (e.g., using communication manager 140 and/or reception component 1102, depicted in FIG. 11) may receive an indication to retransmit HARQ feedback associated with an initial transmission on a first channel, as described above.

As further shown in FIG. 9, in some aspects, process 900 may include transmitting a HARQ codebook associated with the HARQ feedback on a second channel, wherein the HARQ codebook is based at least in part on at least one of: a first channel type of the first channel, or a second channel type of the second channel (block 920). For example, the UE (e.g., using communication manager 140 and/or transmission component 1104, depicted in FIG. 11) may transmit a HARQ codebook associated with the HARQ feedback on a second channel, wherein the HARQ codebook is based at least in part on at least one of: a first channel type of the first channel, or a second channel type of the second channel, as described above.

Process 900 may include additional aspects, such as any single aspect or any combination of aspects described below and/or in connection with one or more other processes described elsewhere herein.

In a first aspect, the HARQ codebook uses a spatial bundling configuration corresponding to the second channel type.

In a second aspect, alone or in combination with the first aspect, the HARQ codebook uses a spatial bundling configuration corresponding to the first channel type.

In a third aspect, alone or in combination with one or more of the first and second aspects, a spatial bundling configuration of the HARQ codebook is based at least in part on whether the HARQ codebook is a dynamic HARQ codebook or a semi-static HARQ codebook.

In a fourth aspect, alone or in combination with one or more of the first through third aspects, a spatial bundling configuration of the HARQ codebook is based at least in part on whether the first channel type is different than the second channel type.

In a fifth aspect, alone or in combination with one or more of the first through fourth aspects, a payload size of the HARQ codebook corresponds to a downlink assignment index provided in the indication.

In a sixth aspect, alone or in combination with one or more of the first through fifth aspects, a payload size of the HARQ codebook corresponds to a downlink assignment index provided in a grant associated with the initial transmission.

In a seventh aspect, alone or in combination with one or more of the first through sixth aspects, the HARQ codebook is a retransmission HARQ codebook, and transmitting the HARQ codebook further comprises transmitting a communication including the retransmission HARQ codebook and a second HARQ codebook via the second channel, wherein a downlink assignment index provided in the indication corresponds to a payload size of the second HARQ codebook.

In an eighth aspect, alone or in combination with one or more of the first through seventh aspects, the HARQ codebook is a retransmission HARQ codebook, and transmitting the HARQ codebook further comprises transmitting a communication including the HARQ codebook and a second HARQ codebook via the second channel, wherein a downlink assignment index provided in the indication corresponds to a payload size of the retransmission HARQ codebook.

In a ninth aspect, alone or in combination with one or more of the first through eighth aspects, the HARQ codebook is a retransmission HARQ codebook, and transmitting the HARQ codebook further comprises transmitting a communication including the HARQ codebook and a second HARQ codebook via the second channel, wherein a downlink assignment index provided in the indication corresponds to a payload size of the retransmission HARQ codebook and a payload size of the second HARQ codebook.

In a tenth aspect, alone or in combination with one or more of the first through ninth aspects, the second channel is a physical uplink shared channel scheduled by a downlink control information (DCI) message, and wherein the DCI message arrives no earlier than the indication.

In an eleventh aspect, alone or in combination with one or more of the first through tenth aspects, the HARQ codebook is a retransmission HARQ codebook, the second channel is a PUCCH, and transmitting the HARQ codebook further comprises transmitting a communication including the HARQ codebook and a second HARQ codebook via the second channel, wherein the indication is received after a downlink grant triggering transmission of the second HARQ codebook, and wherein a PUCCH resource indicator of the indication identifies the second channel.

In a twelfth aspect, alone or in combination with one or more of the first through eleventh aspects, the HARQ codebook is a retransmission HARQ codebook, the second channel is a PUCCH, and transmitting the HARQ codebook further comprises transmitting a communication including the HARQ codebook and a second HARQ codebook via the second channel, wherein the indication is received before a downlink grant triggering transmission of the second HARQ codebook, and wherein a PUCCH resource indicator of the downlink grant identifies the second channel.

In a thirteenth aspect, alone or in combination with one or more of the first through twelfth aspects, the indication is a first indication, the HARQ feedback is first HARQ feedback, the HARQ codebook is a first HARQ codebook, and the method further comprises receiving a second indication to multiplex a retransmission of second HARQ feedback in an uplink communication without having received any grants associated with an initial transmission of the second HARQ feedback, and discarding the second indication based at least in part on not having received any grants associated with the initial transmission of the second HARQ feedback.

In a fourteenth aspect, alone or in combination with one or more of the first through thirteenth aspects, process 900 includes identifying that one or more grants associated with the initial transmission of the HARQ feedback are missing, and transmitting a communication including the HARQ codebook, wherein the HARQ codebook indicates all negative acknowledgments based at least in part on identifying that the one or more grants are missing.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
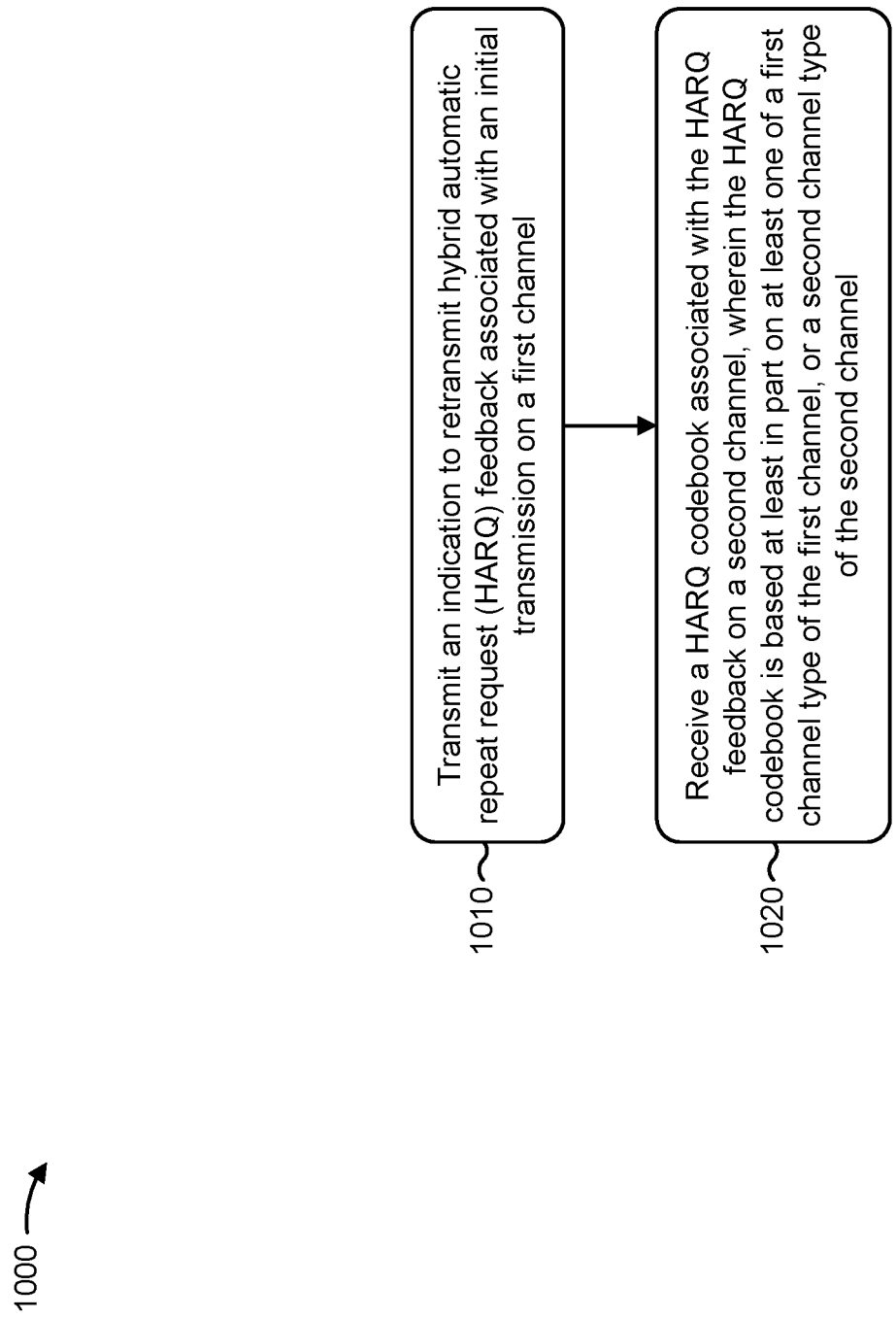
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110, the network node of one or more of examples 500, 600, 700, 702, 704, and/or 800) performs operations associated with HARQ codebook retransmission.

As shown in FIG. 10, in some aspects, process 1000 may include transmitting an indication to retransmit HARQ feedback associated with an initial transmission on a first channel (block 1010). For example, the network node (e.g., using communication manager 150 and/or transmission component 1204, depicted in FIG. 12) may transmit an indication to retransmit HARQ feedback associated with an initial transmission on a first channel, as described above.

As further shown in FIG. 10, in some aspects, process 1000 may include receiving a HARQ codebook associated with the HARQ feedback on a second channel, wherein the HARQ codebook is based at least in part on at least one of: a first channel type of the first channel, or a second channel type of the second channel (block 1020). For example, the network node (e.g., using communication manager 150 and/or reception component 1202, depicted in FIG. 12) may receive a HARQ codebook associated with the HARQ feedback on a second channel, wherein the HARQ codebook is based at least in part on at least one of: a first channel type of the first channel, or a second channel type of the second channel, as described above.

Process 1000 may include additional aspects, such as any single aspect or any combination of aspects described below and/or in connection with one or more other processes described elsewhere herein.

In a first aspect, the HARQ codebook uses a spatial bundling configuration corresponding to the second channel type.

In a second aspect, alone or in combination with the first aspect, the HARQ codebook uses a spatial bundling configuration corresponding to the first channel type.

In a third aspect, alone or in combination with one or more of the first and second aspects, a spatial bundling configuration of the HARQ codebook is based at least in part on whether the HARQ codebook is a dynamic HARQ codebook or a semi-static HARQ codebook.

In a fourth aspect, alone or in combination with one or more of the first through third aspects, a spatial bundling configuration of the HARQ codebook is based at least in part on whether the first channel type is different than the second channel type.

In a fifth aspect, alone or in combination with one or more of the first through fourth aspects, a payload size of the HARQ codebook corresponds to a downlink assignment index provided in the indication.

In a sixth aspect, alone or in combination with one or more of the first through fifth aspects, a payload size of the HARQ codebook corresponds to a downlink assignment index provided in a grant associated with the initial transmission.

In a seventh aspect, alone or in combination with one or more of the first through sixth aspects, the HARQ codebook is a retransmission HARQ codebook, and receiving the HARQ codebook further comprises receiving a communication including the retransmission HARQ codebook and a second HARQ codebook via the second channel, wherein a downlink assignment index provided in the indication corresponds to a payload size of the second HARQ codebook.

In an eighth aspect, alone or in combination with one or more of the first through seventh aspects, the HARQ codebook is a retransmission HARQ codebook, and receiving the HARQ codebook further comprises receiving a communication including the HARQ codebook and a second HARQ codebook via the second channel, wherein a downlink assignment index provided in the indication corresponds to a payload size of the retransmission HARQ codebook.

In a ninth aspect, alone or in combination with one or more of the first through eighth aspects, the HARQ codebook is a retransmission HARQ codebook, and receiving the HARQ codebook further comprises receiving a communication including the HARQ codebook and a second HARQ codebook via the second channel, wherein a downlink assignment index provided in the indication corresponds to a payload size of the retransmission HARQ codebook and a payload size of the second HARQ codebook.

In a tenth aspect, alone or in combination with one or more of the first through ninth aspects, the second channel is a physical uplink shared channel scheduled by a DCI message, and wherein the DCI message is transmitted no earlier than the indication.

In an eleventh aspect, alone or in combination with one or more of the first through tenth aspects, the HARQ codebook is a retransmission HARQ codebook, the second channel is a PUCCH, and receiving the HARQ codebook further comprises receiving a communication including the HARQ codebook and a second HARQ codebook via the second channel, wherein the indication is received after a downlink grant triggering transmission of the second HARQ codebook, and wherein a PUCCH resource indicator of the indication identifies the second channel.

In a twelfth aspect, alone or in combination with one or more of the first through eleventh aspects, the HARQ codebook is a retransmission HARQ codebook, the second channel is a PUCCH, and receiving the HARQ codebook further comprises receiving a communication including the HARQ codebook and a second HARQ codebook via the second channel, wherein the indication is received before a downlink grant triggering transmission of the second HARQ codebook, and wherein a PUCCH resource indicator of the downlink grant identifies the second channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
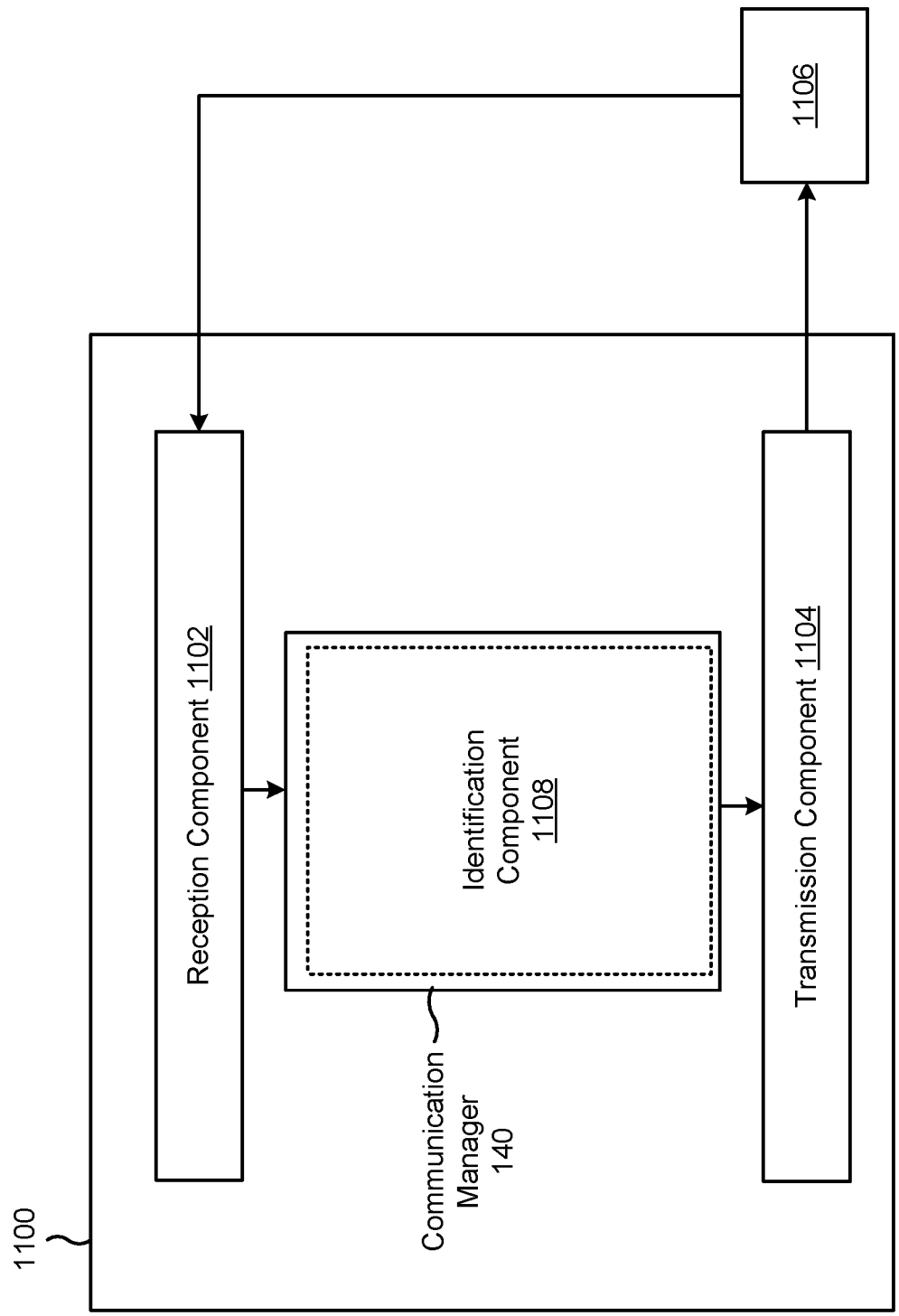
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an identification component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive an indication to retransmit HARQ feedback associated with an initial transmission on a first channel. The transmission component 1104 may transmit a HARQ codebook associated with the HARQ feedback on a second channel, wherein the HARQ codebook is based at least in part on at least one of a first channel type of the first channel, or a second channel type of the second channel.

The identification component 1108 may identify that one or more grants associated with the initial transmission of the HARQ feedback are missing.

The transmission component 1104 may transmit a communication including the HARQ codebook, wherein the HARQ codebook indicates all negative acknowledgments based at least in part on identifying that the one or more grants are missing.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
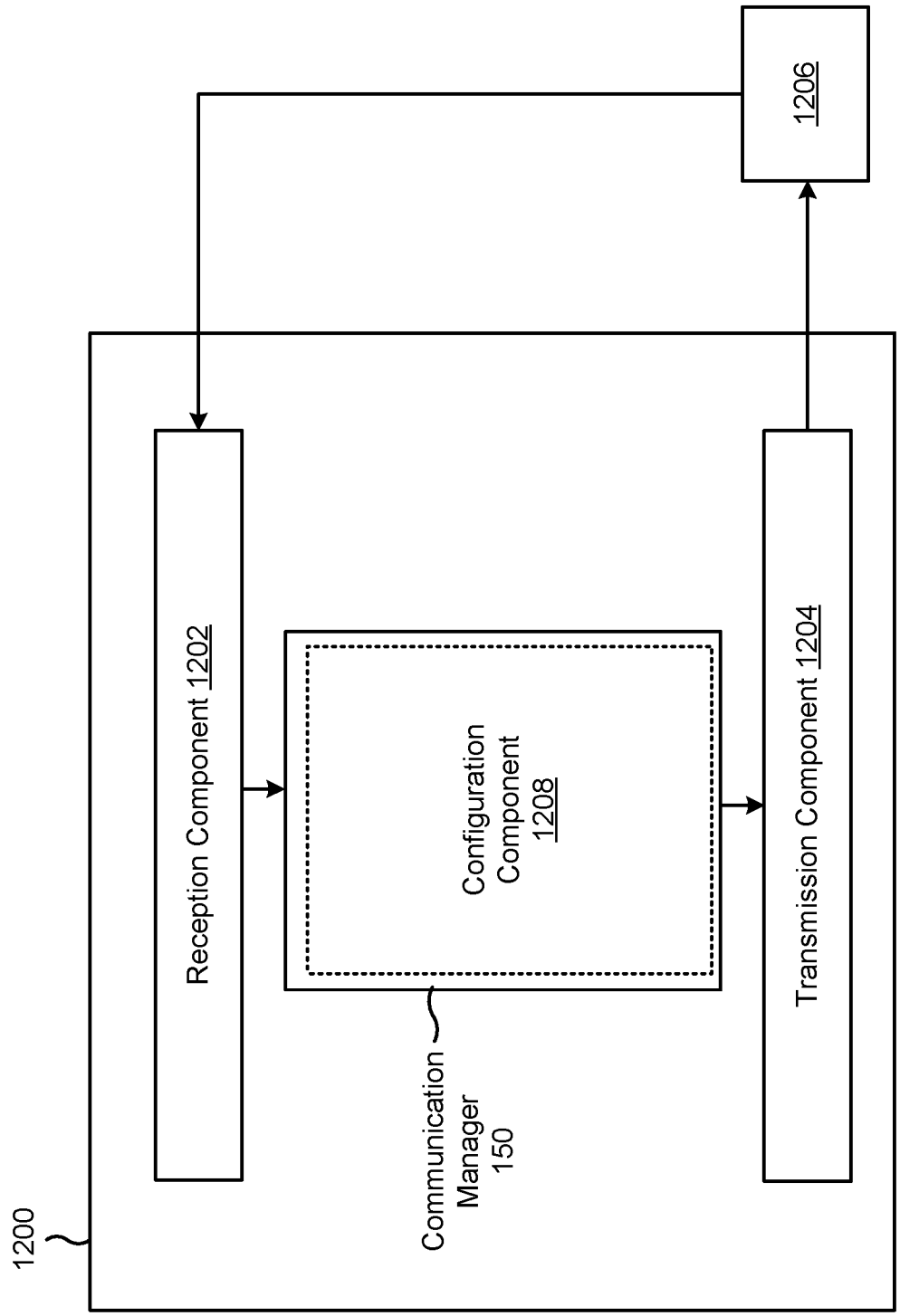
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a configuration component 1208, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206 or a network node. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/ processor, a memory, or a combination thereof, of the network node described in connection with FIG. 2. In some aspects, the transmission component 1204 may be co-located with the reception component 1202 in a transceiver. In some aspects, the transmission component 1204 and/or the reception component 1202 may include an interface for communication with a network node.

The transmission component 1204 may transmit an indication to retransmit HARQ feedback associated with an initial transmission on a first channel. The reception component 1202 may receive a HARQ codebook associated with the HARQ feedback on a second channel, wherein the HARQ codebook is based at least in part on at least one of a first channel type of the first channel, or a second channel type of the second channel. The configuration component 1208 may configure the apparatus 1206, such as to implement the operations described with regard to FIGS. 5-8.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving an indication to retransmit hybrid automatic repeat request (HARQ) feedback associated with an initial transmission on a first channel; and transmitting a HARQ codebook associated with the HARQ feedback on a second channel, wherein the HARQ codebook is based at least in part on at least one of: a first channel type of the first channel, or a second channel type of the second channel.

Aspect 2: The method of Aspect 1, wherein the HARQ codebook uses a spatial bundling configuration corresponding to the second channel type.

Aspect 3: The method of Aspect 1, wherein the HARQ codebook uses a spatial bundling configuration corresponding to the first channel type.

Aspect 4: The method of any of Aspects 1-3, wherein a spatial bundling configuration of the HARQ codebook is based at least in part on whether the HARQ codebook is a dynamic HARQ codebook or a semi-static HARQ codebook.

Aspect 5: The method of any of Aspects 1-4, wherein a spatial bundling configuration of the HARQ codebook is based at least in part on whether the first channel type is different than the second channel type.

Aspect 6: The method of any of Aspects 1-5, wherein a payload size of the HARQ codebook corresponds to a downlink assignment index provided in the indication.

Aspect 7: The method of any of Aspects 1-5, wherein a payload size of the HARQ codebook corresponds to a downlink assignment index provided in a grant associated with the initial transmission.

Aspect 8: The method of any of Aspects 1-7, wherein the HARQ codebook is a retransmission HARQ codebook, and transmitting the HARQ codebook further comprises: transmitting a communication including the retransmission HARQ codebook and a second HARQ codebook via the second channel, wherein a downlink assignment index provided in the indication corresponds to a payload size of the second HARQ codebook.

Aspect 9: The method of any of Aspects 1-7, wherein the HARQ codebook is a retransmission HARQ codebook, and transmitting the HARQ codebook further comprises: transmitting a communication including the HARQ codebook and a second HARQ codebook via the second channel, wherein a downlink assignment index provided in the indication corresponds to a payload size of the retransmission HARQ codebook.

Aspect 10: The method of any of Aspects 1-7, wherein the HARQ codebook is a retransmission HARQ codebook, and transmitting the HARQ codebook further comprises: transmitting a communication including the HARQ codebook and a second HARQ codebook via the second channel, wherein a downlink assignment index provided in the indication corresponds to a payload size of the retransmission HARQ codebook and a payload size of the second HARQ codebook.

Aspect 11: The method of any of Aspects 1-10, wherein the second channel is a physical uplink shared channel scheduled by a downlink control information (DCI) message, and wherein the DCI message arrives no earlier than the indication.

Aspect 12: The method of any of Aspects 1-11, wherein the HARQ codebook is a retransmission HARQ codebook, the second channel is a physical uplink control channel (PUCCH), and transmitting the HARQ codebook further comprises: transmitting a communication including the HARQ codebook and a second HARQ codebook via the second channel, wherein the indication is received after a downlink grant triggering transmission of the second HARQ codebook, and wherein a PUCCH resource indicator of the indication identifies the second channel.

Aspect 13: The method of any of Aspects 1-11, wherein the HARQ codebook is a retransmission HARQ codebook, the second channel is a physical uplink control channel (PUCCH), and transmitting the HARQ codebook further comprises: transmitting a communication including the HARQ codebook and a second HARQ codebook via the second channel, wherein the indication is received before a downlink grant triggering transmission of the second HARQ codebook, and wherein a PUCCH resource indicator of the downlink grant identifies the second channel.

Aspect 14: The method of any of Aspects 1-11, wherein the indication is a first indication, the HARQ feedback is first HARQ feedback, the HARQ codebook is a first HARQ codebook, and the method further comprises: receiving a second indication to multiplex a retransmission of second HARQ feedback in an uplink communication without having received any grants associated with an initial transmission of the second HARQ feedback; and discarding the second indication based at least in part on not having received any grants associated with the initial transmission of the second HARQ feedback.

Aspect 15: The method of any of Aspects 1-14, further comprising: identifying that one or more grants associated with the initial transmission of the HARQ feedback are missing; and transmitting a communication including the HARQ codebook, wherein the HARQ codebook indicates all negative acknowledgments based at least in part on identifying that the one or more grants are missing.

Aspect 16: A method of wireless communication performed by a network node, comprising: transmitting an indication to retransmit hybrid automatic repeat request (HARQ) feedback associated with an initial transmission on a first channel; and receiving a HARQ codebook associated with the HARQ feedback on a second channel, wherein the HARQ codebook is based at least in part on at least one of: a first channel type of the first channel, or a second channel type of the second channel.

Aspect 17: The method of Aspect 16, wherein the HARQ codebook uses a spatial bundling configuration corresponding to the second channel type.

Aspect 18: The method of Aspect 16, wherein the HARQ codebook uses a spatial bundling configuration corresponding to the first channel type.

Aspect 19: The method of any of Aspects 16-18, wherein a spatial bundling configuration of the HARQ codebook is based at least in part on whether the HARQ codebook is a dynamic HARQ codebook or a semi-static HARQ codebook.

Aspect 20: The method of any of Aspects 16-19, wherein a spatial bundling configuration of the HARQ codebook is based at least in part on whether the first channel type is different than the second channel type.

Aspect 21: The method of any of Aspects 16-20, wherein a payload size of the HARQ codebook corresponds to a downlink assignment index provided in the indication.

Aspect 22: The method of any of Aspects 16-20, wherein a payload size of the HARQ codebook corresponds to a downlink assignment index provided in a grant associated with the initial transmission.

Aspect 23: The method of any of Aspects 16-22, wherein the HARQ codebook is a retransmission HARQ codebook, and receiving the HARQ codebook further comprises: receiving a communication including the retransmission HARQ codebook and a second HARQ codebook via the second channel, wherein a downlink assignment index provided in the indication corresponds to a payload size of the second HARQ codebook.

Aspect 24: The method of any of Aspects 16-22, wherein the HARQ codebook is a retransmission HARQ codebook, and receiving the HARQ codebook further comprises: receiving a communication including the HARQ codebook and a second HARQ codebook via the second channel, wherein a downlink assignment index provided in the indication corresponds to a payload size of the retransmission HARQ codebook.

Aspect 25: The method of any of Aspects 16-22, wherein the HARQ codebook is a retransmission HARQ codebook, and receiving the HARQ codebook further comprises: receiving a communication including the HARQ codebook and a second HARQ codebook via the second channel, wherein a downlink assignment index provided in the indication corresponds to a payload size of the retransmission HARQ codebook and a payload size of the second HARQ codebook.

Aspect 26: The method of any of Aspects 16-25, wherein the second channel is a physical uplink shared channel scheduled by a downlink control information (DCI) message, and wherein the DCI message is transmitted no earlier than the indication.

Aspect 27: The method of any of Aspects 16-26, wherein the HARQ codebook is a retransmission HARQ codebook, the second channel is a physical uplink control channel (PUCCH), and receiving the HARQ codebook further comprises: receiving a communication including the HARQ codebook and a second HARQ codebook via the second channel, wherein the indication is received after a downlink grant triggering transmission of the second HARQ codebook, and wherein a PUCCH resource indicator of the indication identifies the second channel.

Aspect 28: The method of any of Aspects 16-26, wherein the HARQ codebook is a retransmission HARQ codebook, the second channel is a physical uplink control channel (PUCCH), and receiving the HARQ codebook further comprises: receiving a communication including the HARQ codebook and a second HARQ codebook via the second channel, wherein the indication is received before a downlink grant triggering transmission of the second HARQ codebook, and wherein a PUCCH resource indicator of the downlink grant identifies the second channel.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive an indication to retransmit hybrid automatic repeat request (HARQ) feedback associated with an initial transmission of a HARQ codebook in a first slot on a first channel; and
        transmit a retransmission of the HARQ codebook associated with the HARQ feedback on a second channel in a second slot, wherein a spatial bundling configuration of the retransmission of the HARQ codebook is based at least in part on at least one of:
            a first channel type of the first channel, or
            a second channel type of the second channel.

2. The UE of claim 1, wherein the spatial bundling configuration corresponds to the second channel type.

3. The UE of claim 1, wherein the spatial bundling configuration corresponds to the first channel type.

4. The UE of claim 1, wherein the spatial bundling configuration is based at least in part on whether the HARQ codebook is a dynamic HARQ codebook or a semi-static HARQ codebook.

5. The UE of claim 1, wherein the spatial bundling configuration is based at least in part on whether the first channel type is different than the second channel type.

6. The UE of claim 1, wherein a payload size of the HARQ codebook corresponds to a downlink assignment index provided in the indication.

7. The UE of claim 1, wherein a payload size of the HARQ codebook corresponds to a downlink assignment index provided in a grant associated with the initial transmission.

8. The UE of claim 1, wherein the HARQ codebook is a retransmission HARQ codebook, and the one or more processors, to transmit the HARQ codebook, are configured to:
    transmit a communication including the retransmission HARQ codebook and a second HARQ codebook via the second channel, wherein a downlink assignment index provided in the indication corresponds to a payload size of the second HARQ codebook.

9. The UE of claim 1, wherein the HARQ codebook is a retransmission HARQ codebook, and the one or more processors, to transmit the HARQ codebook, are configured to:
    transmit a communication including the HARQ codebook and a second HARQ codebook via the second channel, wherein a downlink assignment index provided in the indication corresponds to a payload size of the retransmission HARQ codebook.

10. The UE of claim 1, wherein the HARQ codebook is a retransmission HARQ codebook, and the one or more processors, to transmit the HARQ codebook, are configured to:
    transmit a communication including the HARQ codebook and a second HARQ codebook via the second channel, wherein a downlink assignment index provided in the indication corresponds to a payload size of the retransmission HARQ codebook and a payload size of the second HARQ codebook.

11. The UE of claim 1, wherein the second channel is a physical uplink shared channel scheduled by a downlink control information (DCI) message, and wherein the DCI message arrives no earlier than the indication.

12. The UE of claim 1, wherein the HARQ codebook is a retransmission HARQ codebook, the second channel is a physical uplink control channel (PUCCH), and the one or more processors, to transmit the HARQ codebook, are configured to:
    transmit a communication including the HARQ codebook and a second HARQ codebook via the second channel, wherein the indication is received after a downlink grant triggering transmission of the second HARQ codebook, and wherein a PUCCH resource indicator of the indication identifies the second channel.

13. The UE of claim 1, wherein the HARQ codebook is a retransmission HARQ codebook, the second channel is a physical uplink control channel (PUCCH), and the one or more processors, to transmit the HARQ codebook, are configured to:
    transmit a communication including the HARQ codebook and a second HARQ codebook via the second channel, wherein the indication is received before a downlink grant triggering transmission of the second HARQ codebook, and wherein a PUCCH resource indicator of the downlink grant identifies the second channel.

14. The UE of claim 1, wherein the indication is a first indication, the HARQ feedback is first HARQ feedback, the HARQ codebook is a first HARQ codebook, and the one or more processors are configured to:
    receive a second indication to multiplex a retransmission of second HARQ feedback in an uplink communication without having received any grants associated with an initial transmission of the second HARQ feedback; and
    discard the second indication based at least in part on not having received any grants associated with the initial transmission of the second HARQ feedback.

15. The UE of claim 1, wherein the one or more processors are further configured to:
    identify that one or more grants associated with the initial transmission of the HARQ feedback are missing; and
    transmit a communication including the HARQ codebook, wherein the HARQ codebook indicates all negative acknowledgments based at least in part on identifying that the one or more grants are missing.

16. A network node for wireless communication, comprising:
    a memory; and
    one or more processors, coupled to the memory, configured to:
        transmit an indication to retransmit hybrid automatic repeat request (HARQ) feedback associated with an initial transmission of a HARQ codebook in a first slot on a first channel; and
        receive a retransmission of the HARQ codebook associated with the HARQ feedback on a second channel in a second slot, wherein a spatial bundling configuration of the retransmission of the HARQ codebook is based at least in part on at least one of:
            a first channel type of the first channel, or
            a second channel type of the second channel.

17. The network node of claim 16, wherein the spatial bundling configuration is based at least in part on whether the HARQ codebook is a dynamic HARQ codebook or a semi-static HARQ codebook.

18. The network node of claim 16, wherein the spatial bundling configuration is based at least in part on whether the first channel type is different than the second channel type.

19. The network node of claim 16, wherein a payload size of the HARQ codebook corresponds to a downlink assignment index provided in the indication.

20. The network node of claim 16, wherein a payload size of the HARQ codebook corresponds to a downlink assignment index provided in a grant associated with the initial transmission.

21. The network node of claim 16, wherein the HARQ codebook is a retransmission HARQ codebook, and the one or more processors, to receive the HARQ codebook, are configured to:
    receive a communication including the retransmission HARQ codebook and a second HARQ codebook via the second channel, wherein a downlink assignment index provided in the indication corresponds to a payload size of the second HARQ codebook.

22. The network node of claim 16, wherein the HARQ codebook is a retransmission HARQ codebook, and the one or more processors, to receive the HARQ codebook, are configured to:
    receive a communication including the HARQ codebook and a second HARQ codebook via the second channel, wherein a downlink assignment index provided in the indication corresponds to a payload size of the retransmission HARQ codebook.

23. The network node of claim 16, wherein the HARQ codebook is a retransmission HARQ codebook, and the one or more processors, to receive the HARQ codebook, are configured to:
    receive a communication including the HARQ codebook and a second HARQ codebook via the second channel, wherein a downlink assignment index provided in the indication corresponds to a payload size of the retransmission HARQ codebook and a payload size of the second HARQ codebook.

24. The network node of claim 16, wherein the second channel is a physical uplink shared channel scheduled by a downlink control information (DCI) message, and wherein the DCI message is transmitted no earlier than the indication.

25. The network node of claim 16, wherein the HARQ codebook is a retransmission HARQ codebook, the second channel is a physical uplink control channel (PUCCH), and the one or more processors, to receive the HARQ codebook, are configured to:
    receive a communication including the HARQ codebook and a second HARQ codebook via the second channel, wherein the indication is received after a downlink grant triggering transmission of the second HARQ codebook, and wherein a PUCCH resource indicator of the indication identifies the second channel.

26. The network node of claim 16, wherein the HARQ codebook is a retransmission HARQ codebook, the second channel is a physical uplink control channel (PUCCH), and the one or more processors, to receive the HARQ codebook, are configured to:
    receive a communication including the HARQ codebook and a second HARQ codebook via the second channel, wherein the indication is received before a downlink grant triggering transmission of the second HARQ codebook, and wherein a PUCCH resource indicator of the downlink grant identifies the second channel.

27. A method of wireless communication performed by a user equipment (UE), comprising:
    receiving an indication to retransmit hybrid automatic repeat request (HARQ) feedback associated with an initial transmission of a HARQ codebook in a first slot on a first channel; and
    transmitting a retransmission of the HARQ codebook associated with the HARQ feedback on a second channel in a second slot, wherein a spatial bundling configuration of the retransmission of the HARQ codebook is based at least in part on at least one of:
    a first channel type of the first channel, or
    a second channel type of the second channel.

28. The method of claim 27, wherein the spatial bundling configuration is based at least in part on whether the first channel type is different than the second channel type.

29. A method of wireless communication performed by a network node, comprising:
    transmitting an indication to retransmit hybrid automatic repeat request (HARQ) feedback associated with an initial transmission of a HARQ codebook in a first slot on a first channel; and
    receiving a retransmission of the HARQ codebook associated with the HARQ feedback on a second channel in a second slot, wherein a spatial bundling configuration of the retransmission of the HARQ codebook is based at least in part on at least one of:
    a first channel type of the first channel, or
    a second channel type of the second channel.

30. The method of claim 29, wherein the spatial bundling configuration is based at least in part on whether the first channel type is different than the second channel type.

* * * * *